United States Patent [19]
Funkenbusch et al.

[11] Patent Number: 5,108,597
[45] Date of Patent: Apr. 28, 1992

[54] CARBON-CLAD ZIRCONIUM OXIDE PARTICLES

[75] Inventors: Eric F. Funkenbusch, St. Paul; Peter W. Carr, Minneapolis; Douglas A. Hanggi; Thomas P. Weber, both of St. Paul, all of Minn.

[73] Assignee: Regents of the University of Minnesota, Minneapolis, Minn.

[21] Appl. No.: 497,594

[22] Filed: Mar. 22, 1990

[51] Int. Cl.$^5$ .............................................. B01D 15/08
[52] U.S. Cl. ............................ 210/198.2; 210/502.1; 210/635; 210/656; 502/159; 502/182; 502/402; 502/416; 502/417
[58] Field of Search ............... 502/400, 401, 402, 159, 502/182, 416, 417; 210/635, 656, 198.2, 502.1

[56] References Cited

U.S. PATENT DOCUMENTS

| | | | |
|---|---|---|---|
| 3,782,075 | 1/1974 | Kirkland | 55/67 |
| 3,783,101 | 1/1974 | Tomb et al. | 195/63 |
| 3,841,971 | 10/1974 | Messing | 195/63 |
| 3,850,751 | 11/1974 | Messing | 195/63 |
| 3,855,172 | 12/1974 | Iler et al. | 260/39 R |
| 3,862,908 | 1/1975 | Fitch et al. | 252/301.1 S |
| 3,892,580 | 7/1975 | Messing | 106/41 |
| 3,892,678 | 7/1975 | Halasz et al. | 252/426 |
| 3,910,851 | 10/1975 | Messing | 252/455 R |
| 3,920,865 | 11/1975 | Laufer et al. | 427/220 |
| 3,956,179 | 5/1976 | Sebastian et al. | 252/430 |
| 4,010,242 | 3/1977 | Iler et al. | 423/335 |
| 4,138,336 | 2/1979 | Mendel et al. | 210/198.2 |
| 4,203,772 | 5/1980 | Davis, Jr. et al. | 106/40 R |
| 4,225,463 | 9/1980 | Unger et al. | 502/426 |
| 4,244,935 | 1/1981 | Dell | 423/491 |
| 4,298,500 | 11/1981 | Abbott | 252/428 |
| 4,330,440 | 5/1982 | Ayers et al. | 525/54.31 |
| 4,386,010 | 5/1983 | Hildebrandt | 252/428 |
| 4,389,385 | 6/1983 | Ramsay | 423/332 |
| 4,497,675 | 2/1985 | Aulich et al. | 437/164 |
| 4,517,241 | 5/1985 | Alpert | 428/332 |
| 4,520,122 | 5/1985 | Arena | 502/152 |
| 4,544,485 | 10/1985 | Pinkerton et al. | 210/502.1 |
| 4,600,646 | 7/1986 | Stout | 428/405 |
| 4,648,975 | 3/1987 | Barkatt et al. | 210/656 |
| 4,673,734 | 6/1987 | Tayot et al. | 530/364 |
| 4,699,717 | 10/1987 | Riesner et al. | 210/635 |
| 5,015,373 | 5/1991 | Carr et al. | 210/198.2 |

FOREIGN PATENT DOCUMENTS

| | | | |
|---|---|---|---|
| 169245 | 5/1977 | Czechoslovakia | 210/198.2 |
| 207839 | 12/1983 | Czechoslovakia | 210/198.2 |
| 0162716 | 10/1985 | European Pat. Off. | 210/198.2 |
| 0216730 | 4/1987 | European Pat. Off. | 210/198.2 |
| 0273756 | 7/1988 | European Pat. Off. | 210/198.2 |
| 0280673 | 8/1988 | European Pat. Off. | 210/198.2 |
| 0331283 | 9/1989 | European Pat. Off. | 210/198.2 |
| 3440018 | 3/1986 | Fed. Rep. of Germany | 210/198.2 |
| 55-95682 | 7/1980 | Japan | 210/198.2 |
| 55-95689 | 7/1980 | Japan | 210/198.2 |
| 58-36987 | 3/1983 | Japan | 210/198.2 |
| 60-114562 | 6/1985 | Japan | 210/198.2 |
| 62-129144 | 6/1987 | Japan | 210/198.2 |
| 62-292611 | 12/1987 | Japan | 210/198.2 |
| 63-123817 | 5/1988 | Japan | 210/198.2 |
| 8600646 | 10/1987 | Netherlands | 210/198.2 |
| 2035282 | 6/1980 | United Kingdom | 210/198.2 |

OTHER PUBLICATIONS

Aigner-Held et al., *J. Chromatography*, 189, 139–144 (1980).
Barth et al., *Analytical Chemistry*, 60, 411R–413R, 429R–430R (1988).
Bebris et al., *Chromatographia*, 11, 206–211 (1978).
Bien-Vogelsang et al., *Chromatographia*, 19, 170–176 (1984).
Butterworth et al., *Applied Catalysis*, 16, 375–388 (1985).
Carrott et al., *Colloids and Surfaces*, 21, 9–15 (1986).
Chiantore et al., *Analytical Chemistry*, 60, 638–642 (1988).

(List continued on next page.)

OTHER PUBLICATIONS

Clearfield et al., "New Inorganic Ion Exchangers", in *Ion Exchange and Solvent Extraction*, 5, Chapter 1, 1-61 and 104-120 (1973).
Colin et al., *J. Chromatography*, 149, 169-197 (1978).
Colin et al., *J. Chromatography*, 158, 183-205 (1978).
Colin et al., *J. Chromatrography*, 167, 41-65 (1978).
Dawidowicz et al., *Chromatographia*, 17, 627-632 (1983).
Figge et al., *J. Chromatography*, 351, 393-408 (1986).
Ghaemi et al., *J. Chromatography*, 174, 51-59 (1979).
Gierak et al., *Chem. Anal.* 26, 93-98 (1981) (with English Abstract).
Haas, *Chemical Engineering Progress*, 44-52 (Apr. 1989).
Knox et al., *European Chromatography News*, 1, 12-17 (1987).
Kolla et al., *Chromatographia*, 23, 465-472 (1987).
Kotlensky, "Deposition of Pyrolytic Carbon in Porous Solids", in *The Chemistry and Physics of Carbon*, 173-263 (P. Walker et al., eds. 1973).
Kraus et al., *Nature*, 1128-1129 (Jun. 16, 1956).
Leboda et al., *Chromatographia*, 12, No. 4, 207-211 (1979).
Leboda, *Chromatographia*, 13, No. 9, 549-554 (1980).
Leboda, *Chromatographia*, 13, No. 11, 703-708 (1980).
Leboda, *Chromatographia*, 14, No. 9, 524-528 (1981).
Marsh et al., *Biotechnology and Bioengineering*, XVIII, 349-362 (1976).
Maya et al., *J. Chromatography*, 190, 145-149 (1980).
McDonald et al., "Strategies for Successful Preparative Liquid Chromatography", in *Preparative Liquid Chromatography*, *J. Chromatography Library*, 38, 1, 6, 26-31, 62-64 (1987).
Ogawa et al., Japanese Report JAERI-M 82-152, Japanese Atomic Energy Research Institute (1982).
Pepper et al., "Alumina Fiber Strength Improvement", NASA Report No. CR-167999 (Sep. 1982).
Rigney, "The Development of Porous Zirconia as a Support for Reversed-Phase High-Performance Liquid Chromatography", Ph.D. Thesis, Jun. 1988, Abstract publication #89-15825 (published 1989).
Schomburg et al., *J. Chromatography*, 282, 27-39 (1983).
Schomberg et al., *Chromatographia*, 18, 265-274 (1984).
Schomburg, *LC-GC*, 6, 36 (1988).
Stout et al., *J. Chromatography*, 326, 63-78 (1985).
Toth, *Transition Metal Carbides and Nitrides*, Academic Press, pp. 11-28 (1971).
Unger, *Analytical Chemistry*, 55, 361-375 (1983).
Winslow et al., *J. Catalysis*, 86, 158-172 (1984).
ES Industries, "Application News ($\gamma$RP-1 HPLC Column and Comparison of the Chromegabond $\gamma$RP-1 and $\gamma$C18 Phases)", (Mar. 1987).

*Primary Examiner*—Ernest G. Therkorn
*Attorney, Agent, or Firm*—Merchant, Gould, Smith, Edell, Welter & Schmidt

[57] ABSTRACT

Carbon-clad zirconium oxide particles are disclosed which are useful in sorbent applications, particularly as packing materials for High Performance Liquid Chromatography (HPLC). A method for the preparation of chromatographic support material is also disclosed which utilizes low pressure.

10 Claims, 6 Drawing Sheets

CARBON-CLAD ZIRCONIUM OXIDE PARTICLES

FIELD OF THE INVENTION

The present invention provides carbon-clad inorganic oxide particles which are useful as a chromatographic support material. The invention also provides a method for forming a chromatographic support material, by depositing a cladding of carbon on inorganic oxide particles by a chemical vapor deposition (CVD) process carried out at low pressure.

BACKGROUND OF THE INVENTION

A. Inorganic Oxide-Based Chromatographic Supports

Currently known inorganic chromatography supports comprising particulate silica ($SiO_2$) or alumina ($Al_2O_3$) are stable over pH ranges of about 1-8 and 3-12, respectively. The solubilization of $SiO_2$ and $Al_2O_3$ at pHs outside of these ranges results in the deterioration of these supports, and in contamination of the resultant chromatographed and separated products with silicon- or aluminum-containing species. Methods of improving the alkaline stability of particulate $SiO_2$ by cladding the surface with a more base-stable metal oxide such as zirconium oxide ($ZrO_2$) have been disclosed in U.S. Pat. Nos. 4,648,975 and 4,600,646. This cladding is disclosed to increase the upper pH limit at which these supports, also referred to as packings, can be used to 11 and 9.5, respectively. However, these packings still lack adequate stability to allow them to be sterilized and cleaned in, for example, 0.1N aqueous sodium hydroxide (NaOH, pH=13).

Use of porous spherical $ZrO_2$ particles on a thin layer chromatography plate is disclosed in U.S. Pat. No. 4,138,336; a process for the preparation of porous $ZrO_2$ microspheres is taught in U.S. Pat. No. 4,010,242; and chromatographic use of these particles is taught in U.S. Pat. No. 3,782,075. The microspheres are prepared by a process in which colloidal metal oxide particles are mixed with a polymerizable organic material and coacervated into spherical particles by initiating polymerization of the organic material. This is a time consuming, batch process which requires the addition of organic material which is later pyrolized and hence lost.

U.S. Pat. No. 3,862,908 discloses microspheres of urania and other metal oxides; however, these particles are fired to near full density, have reduced surface areas and therefore, would not be desirable for chromatographic uses.

U.S. Pat. No. 3,892,580 discloses a process for preparing porous bodies of $ZrO_2$. This process requires the use of a binder to react with the oxide particles during preparation. This binder is subsequently decomposed by pyrolysis and therefore lost. The bodies produced by this process are not spherical, would pack unevenly, may cause increased column pressure, and are therefore not preferred for chromatographic uses.

U.S. Pat. No. 4,389,385 teaches the preparation of porous gels and ceramic materials by dispersing solid particles of an inorganic substance produced by a vapor phase condensation method in a liquid to form a sol. The sol contains colloidal particles which are aggregates of the primary particles. The sol is dried to produce a porous gel of greater than 70% by volume porosity.

Commonly-assigned U.S. patent application Ser. No. 07/420,150, filed Oct. 11, 1989, now U.S. Pat. No. 5,015,373, discloses a support material adapted for use as the stationary phase in liquid chromatography (LC), which comprises $ZrO_2$ spherules preferably having a diameter of about 0.5-200 μ, a surface area of about 1-200 m$^2$/g, and pore diameters of about 20-500 Å. A preferred embodiment of the invention disclosed in the 'b 150 application is directed to a chromatographic support material comprising $ZrO_2$ spherules having a cross-linked polymeric coating thereon, wherein the coated spherules are hydrophobic, have a pore size from about 20-500 Å and an average diameter of about 0.5-500 μ.

B. Carbon-Based Chromatographic Support Materials

Carbon particles, such as those referred to as "activated carbon," are employed in sorbent applications due to their relatively high specific sorption capacity. This capacity is at least partially due to carbon's low density and the fact that it can be made highly porous.

Carbon has also been employed in chromatographic applications because it offers a hydrophobic and hydrophilic selectivity which is different than that of the silica supports commonly utilized in reversed-phase HPLC. See, e.g., K. Unger, *Analytical Chemistry*, 55, 361-375 (1983) at page 372, column 3. Carbon's selectivity to polar compounds also varies from the selectivities of conventional HPLC packing materials. These differences in selectivity can be advantageously exploited.

A further advantage of carbon-based supports is their pH stability. This stability allows separations to be performed at the optimal pH, and also permits cleaning and sterilizing of the column with, for example, strong base.

Packing materials for high pressure liquid chromatography (HPLC) have also been based on carbon. For example, carbon-based supports useful for HPLC applications have included the following: graphitized carbon black (GCB), pyrocarbon reinforced GCB, and more recently, a porous graphitic carbon (PGC). PGC is prepared by filling the pores of a silica gel with a polymer comprising carbon, thermolyzing the polymer to produce a silica/carbon composite, dissolving out the silica to produce a porous carbon, and subjecting the porous carbon to graphitizing conditions.

For example, U.K. Patent Application No. 2,035,282 discloses a method for producing a porous carbon material suitable for chromatography or use as a catalyst support, which involves depositing carbon in the pores of a porous inorganic template material such as silica gel, porous glass, alumina or other porous refractory oxides having a surface area of at least 1 m$^2$/g, and thereafter removing the template material. O. Chiantore et al., *Analytical Chemistry*, 60, 638-642 (1988), disclose carbon sorbents which were prepared by pyrolysis of either phenol formaldehyde resin or saccharose on spheroidal silica gels coated with these materials. The pyrolysis is performed at 600° C. for one hour in an inert atmosphere, and the silica is subsequently removed by boiling the material in an excess of a 10% NaOH solution for 30 minutes. Chiantore et al. conclude that, at the temperatures employed in their work, the carbonaceous polymer network that was formed still maintained some of the chemical features of the starting material (page 641, column 2). To obtain carbons where polar functional groups have been completely eliminated, the authors conclude that high temperatures (greater than 800° C) treatments under inert atmosphere are necessary.

The use of pyrocarbon-reinforced carbon-based supports for HPLC is also known. For example, K. Unger et al. (U.S. Pat. No. 4,225,463) disclose porous carbon support materials based on activated carbons and/or cokes, which may be useful for HPLC. The materials are prepared by treating hard activated carbon or coke particles with solvents, and then heating them at 2400°-3000° C. under an inert gas atmosphere. The resulting support materials are disclosed as having a carbon content of at least 99 percent, a specific surface area of about 1–5 $m^2$ per gram, and a particle size of about 5–50 $\mu$m (column 2, lines 3–5).

While carbon or carbon-based materials may be useful as HPLC supports, they are less than ideal. For example, K. Unger, *Analytical Chemistry*, 55, 361–375 (1983) concludes that the carbon materials developed for HPLC to date exhibit poor efficiency for strongly retaining compounds.

C. Non-Carbon Based Materials having Carbon Coatings

In addition to materials which comprise a carbon matrix or core, chromatographic support materials are known which have a carbon coating on a substrate of silica. For example, N. K. Bebris et al., *Chromatographia*, 11, 206–211 (1978 disclose the one-hour pyrolysis of benzene at 850° C. onto a substrate of Silochrom C-120, a macroporous silica ($SiO_2$) which contains particles of irregular form with an average size of 80 $\mu$m. Benzene pyrolysis was also carried out at 750° C. onto a substrate of Spherisorb S20W, a silica gel which contains spherical particles of diameter 20 $\mu$m.

R. Leboda, *Chromatographia*, 14, 524–528 (1981) disclose the two-hour pyrolysis of dichloromethane ($CH_2Cl_2$) on partially dehydroxylated silica gel (particle size range 0.15–0.30 mm) at 500° C. and atmospheric pressure. R. Leboda et al., Chromatographia, 12, No. 4, 207–211 (1979) disclose the catalytic decomposition of alcohol onto the surface of $SiO_2$ in an autoclave, at a pressure of 25 atmospheres and a temperature of 350° C. for 6 hours. The resulting material possesses a surface having from "a few to several dozen percent carbon on the surface." R. Leboda, *Chromatographia*, 13, No. 9, 549–554 (1980) discloses contacting $SiO_2$ with alcohols (benzyl alcohol and heptanol) in an autoclave at a temperature of 500° C. R. Leboda, *Chromatographia*. 13, No. 11, 703–708 (1980) discloses the heat treatment in hydrogen at 700° C. of $SiO_2$ adsorbents previously treated with alcohols in an autoclave at 500° C.

P. Carrott et al., *Colloids and Surfaces*, 12, 9–15 (1986) cracked furfuraldehyde vapor on precipitated silica at a temperature of 500° C. for various times, to achieve carbon loadings of 0.5, 8.6 and 16 percent. Carrott et al. conclude that the external surface of the resulting carbon-coated silica was hydrophobic, while the internal surface was hydrophilic, indicating that the internal surfaces were not well coated.

H. Colin et al., *J. Chromatography*, 149, 169–197 (1978) compares non-polar chemically-bonded phases (CBP), pyrocarbon-modified silica gel (PMS) and pyrocarbon-modified carbon black (PMCB) as packings for reversed phase HPLC. H. Colin et al., *J. Chromatography*, 158, 183–205 (1978) compares the efficiency, retention and solvent strength in reversed-phase HPLC of the column packings shown in Table III (page 190), which include 15–20 um particles of pyrocarbon coated on silica, and 25–31.5 um particles of pyrocarbon coated on graphite. H. Colin, *J. Chromatography*. 167, 41–65 (1978) reports the effects of temperature in reversed-phase HPLC on pyrocarbon-containing adsorbents, in terms of heat transfer, solvent eluotropic strength, column linear capacities, pressure drops and efficiencies.

U.K. Patent Application No. 2,035,282, discussed above, also discloses that silica gels whose internal surfaces have been covered by a layer of pyrolytic carbon exhibit good chromatographic performance, but are disadvantageous in that the presence of a silica core means that eluents aggressive to silica cannot be used with these gels. Furthermore, it is difficult to attain complete coverage of the silica surface by carbon because the carbon tends to deposit on surface nuclei already present, rather than on the bare silica (page 1, lines 21–26).

K. Unger et al. (U.S. Pat. No. 4,225,463), discussed above, also disclose that attempts to mask the surfaces of silica gels with non-polar groups via pyrocarbon coating have not alleviated the problematic low stability of $SiO_2$ to aqueous solvent systems, particularly those with higher pH values (column 1, lines 5–48).

Catalyst supports have also been prepared by deposition of carbon on alumina. For example, S. Butterworth et al., *Applied Catalysis*, 16, 375–388 (1985) disclose a $\gamma$-$Al_2O_3$ catalyst support having a coating of carbon deposited by vapor-phase pyrolysis of propylene. The pure phase $\gamma$-$Al_2O_3$ substrate was ground to 12×37 mesh, had a bimodal pore size distribution based around mean diameters of 110 nm, and a surface area of 130 $m^2$/g. When the vapor phase pyrolysis was performed from a flowing gas mixture of argon and propylene at 673K, Butterworth et al. disclose that the pure phase $\gamma$-$Al_2O_3$ was completely covered at a carbon loading of 7 wt-%.

Certain metal oxides have been coated with carbon for use as nuclear reactor fuels. For example, P. Haas, *Chemical Engineering Progress*, 44–52 (April 1989) discloses that small spheres of oxides of U, Th and Pu were required for high-temperature, gas-cooled nuclear reactor fuels. These fuels were coated with pyrolytic carbon or other ceramics to serve as "pressure vessels" which would contain fission products (page 44, column 2). FIG. 2, at page 49, shows dense $ThO_2$ spheres with pyrolytic carbon coatings.

D. Silica-Based Stationary Phases for Reversed-Phase HPLC

The majority of separations employing high performance liquid chromatography are performed in the reversed-phase mode, wherein the column packing material serves as the stationary phase. The most common presently used stationary phases employ a non-polar ligand (e.g., octane or octadecane) covalently bound to a porous silica particle through a siloxane bond (Si—O—Si) to render the silica surface hydrophobic. Although these silica-based supports are very useful for a wide range of applications in reversed-phase HPLC, their use is strictly limited to a pH range of between 2 and 8, due to the hydrolytic instability of both the silica support particle and the siloxane bond used to "anchor" the non-polar active group. Thus, a pH-stable, reversed-phase support material must involve both a stable, controlled-porosity, high-surface area support material and a method for rendering the surface durably hydrophobic.

Art workers have previously coated silica with $ZrO_2$ in attempts to improve the silica's pH stability. Another approach to developing a highly stable reversed-phase support involves replacing the silica with an alternative inorganic material, such as alumina. Although it has been demonstrated that some improvement in pH stability is realized by replacing silica with alumina, the dissolution of alumina in aqueous solutions at extreme pHs (pH<2 and pH>12), at temperatures as low as room temperature, is well known.

In addition to requiring a pH-stable support material, a stable reversed phase also requires modifying the support material in order to provide a stable, hydrophobic surface. Silylation is the most widely used method to derivatize silica particles to produce hydrophobic reversed-phase supports. The silylation of inorganic bodies other than silica (e.g., alumina, titania, zirconia, etc.) has been disclosed in U.S. Pat. No. 3,956,179. The hydrolytic instability of the siloxane bond is well known, and it is very likely that a Si-O-metal bond will be even more susceptible to aqueous hydrolysis because of the increased polarity of the bond.

Another problem related to the use of silica-based reversed phase supports is the difficulty encountered in the chromatography of amines and other basic solutes. This problem results from the presence of acidic silanol groups (SiOH) on the silica surface. Basic solutes undergo very strong interactions with these silanol groups which may involve cation exchange or hydrogen bonding, depending on the pH of the mobile phase. This problem is exaggerated by the requirement of working in the range $2<pH<8$ on silica-based columns, since most amines will be protonated in this pH range and protonated amines can readily adsorb to the silica surface. One approach to improving the chromatography of amines is to work at hydrogen ion concentrations significantly above the ionization constant of the amines so that they are unprotonated. For aliphatic amines, this normally involves working at a pH greater than 11. However, these pH ranges cannot be employed using silica-based columns.

The presence of acidic silanol groups can also lead to irreversible adsorption of many classes of organic molecules onto silica-based reversed-phase supports, a problem which is well known in the art. This irreversible adsorption is particularly troublesome in the reversed-phase HPLC of proteins. Ultimately, this adsorption will result in a change in the properties of the support and can lead to its destruction.

Mobile phase modifiers may be added to improve the chromatographic efficiency of basic compounds, but this can be expensive and hard on equipment. The resulting harsh conditions may cause irreversible conformational and chemical changes in the compound of interest, as well as contamination of compound to be purified.

E. Chemical Vapor Deposition

Chemical vapor deposition (CVD) is a vapor phase process wherein a solid material is formed on a substrate by the thermal dissociation or the chemical reaction of one or more gas species. The deposited solid material can be a metal, semiconductor, alloy, or refractory compound.

The use of CVD processes to produce carbon coatings has been extensively studied. Such processes are used, for example, to carbon coat nuclear materials or to infiltrate porous bodies so as to produce lightweight structural materials. This topic is discussed in more detail in 9 *The Chemistry and Physics of Carbon*, 173-263 (P. Walker et al., eds. 1973), the disclosure of which is incorporated by reference herein.

SUMMARY OF THE INVENTION

The present invention provides a composite support material which is useful as a stationary phase in liquid chromatography, particularly in high-performance liquid chromatography. The composite support material comprises carbon-clad particles of zirconium oxide (also referred to herein as $ZrO_2$, or as "zirconia"). In order to facilitate packing of liquid chromatography columns, it is preferred that each individual unit of the present support material be a substantially spherical particle; thus, the preferred spherical particles will be referred to herein as "spherules." However, the present invention is also intended to provide support materials useful in low performance chromatography, fluidized beds, and general batch absorbers. There is no requirement that the present particles be substantially spherical in these applications, where irregularly shaped particles are typically utilized.

Advantageously, the present carbon-clad $ZrO_2$ particles display very high physical and chemical stability in aqueous media of high pH, e.g., pH 14. At these conditions, the particles are substantially resistant to dissolution of both the carbon cladding and the underlying $ZrO_2$, and provide substantially constant solute retention during exposure to increasing amounts of alkaline mobile phase.

Preferred carbon-clad $ZrO_2$ spherules useful for liquid chromatography applications will comprise a porous core $ZrO_2$ spherule. The core spherules will preferably have a diameter of about 1-500 μ, more preferably about 2-50 μ; a surface area of about 5-300 m²/g, more preferably about 15-100 m²/g; and a pore diameter of about 20-5000 Å, more preferably about 60-1000 Å.

In addition to the core $ZrO_2$ spherule, the support material of the present invention further comprises a cladding of carbon. As used herein, the phrase "carbon-clad" means that an outer layer, sheath, coating, or cladding of pyrolytic carbon is bonded or otherwise integrally attached to the underlying $ZrO_2$ matrix. As used herein, "pyrolytic carbon" is intended to refer to carbon formed by the carbonization of a suitable carbon source, e.g., a hydrocarbon. "Carbonization" means that the hydrocarbon or other carbon source is subjected to conditions causing it to decompose into atomic carbon and other substances.

As mentioned above, the $ZrO_2$ cores of the present carbon-clad particles are porous. When discussing porosity, the term "open pores" refers to interior channels in the particles which exit at the surface of the particle. The term "closed pores" refers to pores which have no exit at the outside surface of the particle. The surface of closed pores are inaccessible to either gas or liquid phases with which the particles are contacted. Thus, the closed pores are not affected by the cladding process, nor do they participate in subsequent use of the particles in surface active applications. As used herein, the term "pores" (or "porosity") refers to "open pores" only. By "surface of the particle", it is meant the exterior surface as well as the surface of the open pores. It is intended that the carbon cladding cover substantially all of the surface of the spherule, thus defined. As used herein, "substantially covering" or "substantially all" means that at least about 75%, preferably at least about 90%, and more preferably at least about 95% of the total surface area of the core $ZrO_2$ spherule will be covered by the carbon cladding.

Preferably, the thickness of the carbon cladding over the surface of the $ZrO_2$ core ranges from the diameter of a single carbon atom (a monatomic layer), to about 20 Å. This carbon cladding will thus not appreciably increase the diameter of the spherules. Thus, preferred carbon-clad $ZrO_2$ spherules of the present invention will have a diameter of about 1–500 microns and more preferably about 2–50 $\mu$. The carbon-clad $ZrO_2$ spherules will preferably have an average pore diameter of about 20–5000 Å, more preferably about 60–1000 Å. The carbon-clad $ZrO_2$ spherules will also preferably have a surface area of about 5–300 $m^2/g$, more preferably about 15–100 $m^2/g$.

The scope of the present invention is also intended to encompass carbon-clad $ZrO_2$ particles which are essentially non-porous. Prior to carbon cladding, preferred non-porous $ZrO_2$ substrate particles will have a diameter of about 0.4–7 microns, a surface area of about 0.1–3 $m^2/g$, and negligible internal porosity, although the particles may have surface roughness. Useful non-porous $ZrO_2$ having the preferred diameter and surface area values can be prepared by methods well known to those of ordinary skill in the art of ceramic powder preparation. The carbon-clad non-porous particles are believed to be particularly useful as a stationary phase support material in liquid chromatography separations of large molecules such as proteins and polymers. The size of such molecules can hinder or prohibit their rapid diffusion in and out of pores of a porous support material.

The present carbon-clad $ZrO_2$ particles may be used as an adsorbent; e.g., for gas or liquid purification. Further, the present carbon-clad $ZrO_2$ particles can be formed into a bed, and employed as the stationary phase in separations performed via chromatography, e.g., by gas, liquid, or super-critical fluid chromatography. Therefore, the particles can be used as the stationary phase in conventional chromatography columns which have an axial flow path, with or without rigid walls. For example, the particles, preferably spherules, can be packed into an HPLC column, where the packing functions as the stationary phase during HPLC separations.

The carbon-clad particles of the present invention can also be combined with a suitable binder and used to coat a glass or plastic substrate to form plates for thin-layer chromatography.

In addition to their utility in chromatographic applications, the present carbon-clad $ZrO_2$ particles may be useful as an adsorptive medium in non-chromatographic applications. For example, the particles may be utilized as an adsorptive medium in batch adsorbers, fluidized bed adsorbers, membrane adsorbers and the like. The particles may also be useful as an adsorptive medium in pressure-swing adsorption apparatuses. In addition, the present particles may be useful as support materials for fixed bed reactors, batch reactors, fluidized bed reactors and the like.

In addition to the carbon-clad $ZrO_2$ particles, the present invention also provides a method for forming a chromatographic support material utilizing chemical vapor deposition. The method comprises the steps of: (a) placing a plurality of porous inorganic oxide particles having a surface within a reaction chamber; (b) establishing an elevated temperature within the reaction chamber, e.g., of about 500°–1500° C.; (c) establishing a reduced pressure within the reaction chamber, e.g., of less than about 760 mm mercury; and (d) introducing a vapor comprising carbon into the chamber so as to decompose the vapor and deposit a cladding of the carbon onto the particles, substantially covering the surface of the particles. The present method may also optionally include an additional step (e) of exposing the carbon-clad particles of step (d) to a gaseous reducing mixture comprising hydrogen so as to cause the reduction of polar functional groups on the surface of the particles. In this manner, a more homogeneous surface chemistry can be achieved.

The present method is applicable to any inorganic oxide substrate to which carbon will deposit under the operating conditions of the method. Useful inorganic oxides include, but are not limited to the Group II, III, and IV metals, i.e., $HfO_2$, $ZrO_2$, $SiO_2$, $Al_2O_3$, $TiO_2$, and $MgO$. Preferably, a $ZrO_2$ or $HfO_2$ substrate is utilized in the present method, because the core $ZrO_2$ or $HfO_2$ particles maintain a useful surface area at the high process temperatures (e.g., about 500°–1500° C.) which are preferred for forming uniform CVD coatings. In contrast, the porous network of alternative substrates, such as silica and alumina particles, may substantially degrade at these temperatures, with a resulting surface area loss which may compromise the chromatographic character of these substrates. Furthermore, $ZrO_2$ or $HfO_2$ are especially preferred substrates because their high chemical stability means that exposure of incompletely carbon-clad $ZrO_2$ or $HfO_2$ particles to aggressive mobile phases (e.g., pH 14), will not result in attack of the support with eventual dissolution. $ZrO_2$ is particularly preferred because it is much less expensive than $HfO_2$.

The present method for forming a chromatographic support material utilizing chemical vapor deposition is intended to include a method for forming an essentially non-porous support material, such as the non-porous carbon-clad $ZrO_2$ described above. When desired, step (a) of the method will comprise the step of placing a plurality of essentially non-porous inorganic oxide particles having a surface within a reaction chamber. The remaining steps (b) through (d) (and optionally step (e)) of the method are not changed by the utilization of a non-porous substrate.

DETAILED DESCRIPTION OF THE INVENTION

Figure 1:
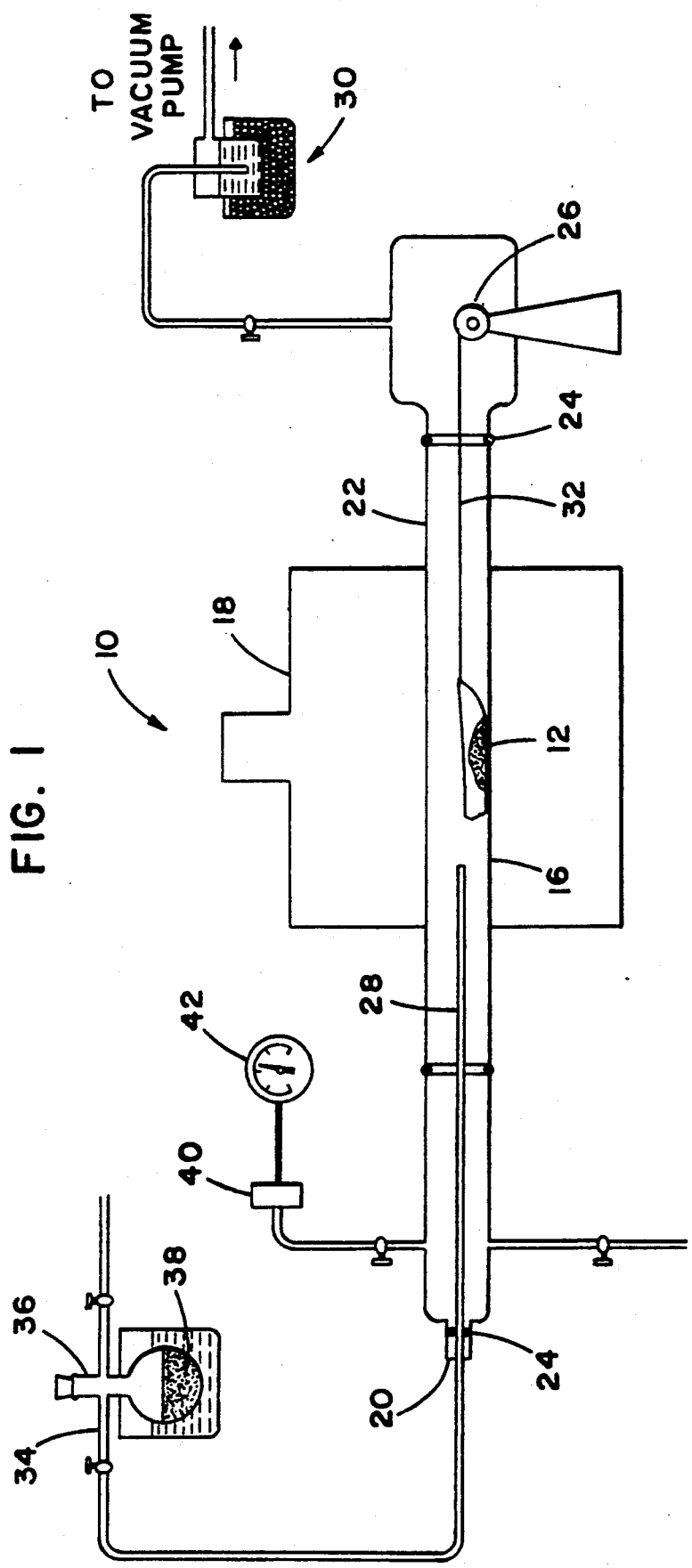
FIG. 1 shows apparatus including a reaction chamber within a small tube chamber.

The present invention provides both a composite material useful as a chromatographic support, and a method for forming a chromatographic support material.

The present material comprises a particle, preferably a spherical particle or "spherule", comprising a core, base or substrate of a porous zirconium oxide, and a cladding of carbon over the porous core. Because an intended use of the present support material is in liquid chromatography applications, it is preferred that the individual units of the material be spherical in shape, in order to permit optimal packing into a column. Therefore, as used herein with respect to the present support material, a "spherule" refers to a substantially spherical particle. Accordingly, as used herein, a "diameter" of a unit of the present support material refers to the average lateral dimension or "particle size" across the particle, but is not intended to imply that the particle is a perfect sphere. The words "spherule" and "particle" are intended to be used interchangeably hereinafter, as are the words "diameter," "size" and "particle size." The present invention is also intended to encompass irregularly shaped particles, which may be useful, e.g., in low performance chromatography, fluidized beds, and general batch absorbers.

The diameter of the core $ZrO_2$ particles may vary within ranges appropriate for the desired use of the particles. Generally in sorbent applications, $ZrO_2$ particles of up to about 1 cm in size are preferred. For liquid chromatography applications, preferred core $ZrO_2$ spherules range in size from about 1-500 $\mu$, and more preferably, about 2-50 $\mu$.

The criteria for utility of a particular material as the core or substrate of the present carbon-clad particles are that the base material, preferably in the form of a spherule, possesses a high total surface area and thus good sorption capacity, and that this surface area is not excessively reduced during the carbon cladding and any other subsequent coating or cladding procedure included within the scope of the present invention. Therefore, useful surface areas for the core $ZrO_2$ particles range from about 5-300 m²/g, more preferably about 15-100 m²/g.

The present carbon-clad $ZrO_2$ particles are preferably prepared by a low pressure chemical vapor deposition (CVD) method, discussed below, which method is also included within the scope of the present invention. Therefore, the pore diameter of the base material must be sufficiently large to permit ready diffusion of hydrocarbon vapor into the pores of the core $ZrO_2$ particle during the CVD. Thus, preferred pore sizes for the core $ZrO_2$ particles range from about 20-5000 Å, more preferably about 60-1000 Å.

The present zirconium oxide cores are clad or coated with a layer of pyrolytic carbon. Terms related to carbon and its formation are discussed and defined in 9 *The Chemistry and Physics of Carbon* 173-263 (P. Walker et al., eds. 1973), the disclosure of which is incorporated by reference herein. For example, at pages 174-175, the authors disclose that "pyrolytic carbon" and "CVD carbon" are generic terms relating to the carbon material that is deposited on the substrate by the thermal pyrolysis of a carbon-bearing vapor. The term "CVD carbon" describes the processing used, whereas the term "pyrolytic carbon" refers more to the type of carbon material that is deposited. The authors further disclose that the process of depositing pyrolytic carbon in porous substrates is generally referred to as "infiltration."

While any method of applying pyrolytic carbon to a porous substrate can be used in the preparation of the present carbon-clad zirconia, it is preferable to apply the carbon cladding in a manner which results in substantial carbon coverage of the porous $ZrO_2$ surface. Our method, detailed below, employs a low pressure chemical vapor deposition technique to substantially clad a porous inorganic oxide particle. For example, by utilizing the present method, a carbon cladding can be applied which covers greater than 98% of the total exposed surface of a porous zirconia particle, within a time period of about 30 minutes and at a deposition temperature of about 700° C., when toluene is used as the carbon source.

The present carbon-clad $ZrO_2$ support material is useful in at least two fields:

First, the present carbon-clad $ZrO_2$ material is useful as a stable reversed-phase chromatographic support material. Advantageously, the selectivity for polarizable solutes and hydroxyl solutes can be exploited to separate these species. The loading capacity of the support for these species can be adjusted, if required, by proper selection of the support material (i.e., pore size and specific surface area) and column size (overall capacity).

Second, the carbon cladding is useful as a covering or masking agent for the $ZrO_2$ surface. $ZrO_2$ surfaces are known to interact strongly with carboxylic acids, sulfonates, phosphates, and the like. These interactions can lead to undesirable behaviors in chromatography applications. Although some residual $ZrO_2$ sites may still remain exposed after the carbon cladding, substantially all of the surface is covered with a carbon cladding whose retentivity can be controlled more easily than the retentivity of bare $ZrO_2$. Improvement of the coating and/or optimization of the pore geometry together with this technology may be used to produce a uniform hydrophobic coating to "seal" the $ZrO_2$ surface.

There is significant solvent selectivity involved in the use of the present carbon-clad $ZrO_2$ for chromatography. The choice of solvent may also affect the level of solute loading which can be practically employed.

I. Sources of Zirconium Oxide

In a preferred embodiment of the present carbon-clad $ZrO_2$ particles, the core $ZrO_2$ particles will be spherules formed from a $ZrO_2$ sol. In this embodiment, a portion, or more preferably a majority, of the initial $ZrO_2$ used to form the core spherules will be in the sol state; i.e., a colloidal dispersion of $ZrO_2$ particles in water. Once the water is removed, the sol particles interact strongly with one another to provide aggregated sol particles.

Colloidal dispersions of zirconium oxide suitable for use as the $ZrO_2$ source in preparation of the present spherules include the Nyacol ™ Zr series, Nyacol, Inc., Ashland, Mass. These dispersions contain about 20 wt-% $ZrO_2$, wherein the $ZrO_2$ particles vary in average diameter, e.g., from about 10-200 nm. For example, Nyacol ™ Zr 100/20 is an aqueous dispersion containing 20 wt-% $ZrO_2$ of colloidal $ZrO_2$ particles, the majority of which are about 100 nm in diameter.

Non-colloidal $ZrO_2$ sources may be included along with the colloidal $ZrO_2$ dispersions as useful starting materials for these spherules. Thus, chloride, nitrate, sulphate, acetate, formate or other inorganic or organic salts of zirconium such as the oxysalts and alkoxides may be included with the $ZrO_2$ sol and the mixture used to make spherules. Preferably, colloidal $ZrO_2$ particles make up the major portion of the total $ZrO_2$ present in the mixture.

Organic compounds may also be included with the $ZrO_2$ sources used to prepare the spherules. These organic materials are removed during the firing of the spherules. In particular, water-soluble polymers such as polyvinylpyrrolidone, polyethylene glycol, polyethylene oxide, and the like, or latex particles may be included in the liquid mixture used to prepare the spherules. These materials may act to alter the rheology of the precursor solution, or the pore structure of the resulting fired spherule.

The core $ZrO_2$ spherules can comprise a minor amount of other metal oxides in addition to $ZrO_2$. For example, precursors for other metal oxides may be included with the $ZrO_2$ precursors, so as to stabilize a particular crystalline phase of $ZrO_2$ or to retard grain growth in the fired spherules. Thus, salts or sols of metals such as yttrium, magnesium, calcium, cerium, aluminum, and the like may be included in levels of from approximately 0–20 mole-%. $ZrO_2$ spherules which do not contain other oxide additives and are fired in air or in oxidizing atmospheres display either monoclinic, tetragonal or pseudocubic crystal structures when cooled to room temperature. Higher firing temperatures and longer firing times favor the formation of the monoclinic phase. The inclusion of other metal oxides allows the preparation of spherules which possess either monoclinic, tetragonal, or cubic crystalline structures.

These features of $ZrO_2$ are well known in the art and are discussed in, for example, *An Introduction to Zirconia*, Magnesium Elektron Ltd., Twickenham, England (2d ed., Magnesium Elektron Publication No. 113, July 1986).

II. Preparation of Core $ZrO_2$ Spherules

In preferred embodiments wherein the core zirconium oxide spherules are to be formed from a $ZrO_2$ sol, an aqueous sol containing a colloidal dispersion of $ZrO_2$ particles can be dispersed in a medium which will extract water from the dispersed sol in the form of droplets. Removal of all or a portion of the water results in gelled solid spherules which consist of aggregated sol particles. One extracting medium which may be used is 2-ethyl-1-hexanol, as disclosed in U.S. Pat. No. 4,138,336. A preferred extracting medium for safety reasons and ease of processing is peanut oil, which is preferably used at a temperature of about 80°–100° C. The most preferred extracting medium is a mixture of peanut oil and oleyl alcohol, which are combined in a ratio of about 1:1 and used at a temperature of about 80°–100° C. Oleyl alcohol possesses a higher extraction capacity than peanut oil, and mixtures of the two allow the extraction capacity of the medium to be controlled. Depending upon the ratio of sol to forming medium, extraction times of from about 1–60 minutes can be used to fully gel the $ZrO_2$ particles. The gelled spherules may be conveniently separated from the extracting medium by any suitable method, e.g., by filtration.

The spherules may also be prepared by the process of spray drying, as disclosed, for example, in U.S. Pat. No. 4,138,336.

Once the $ZrO_2$ particles are condensed into spherules in the above manner, thermal treatment at firing temperatures of from about 100°–1500° C., preferably about 400°–800° C., is performed. The resulting fired spherules are preferably from about 1–500 $\mu$ in diameter, and preferably possess a surface area of 5–300 m$^2$/g and pore diameters of about 20–5000 Å.

III. Low Pressure CVD Method

The present invention also encompasses a method for forming a chromatographic support material utilizing chemical vapor deposition at low pressure. Either porous or essentially non-porous inorganic oxide spherules can be employed as the substrate material. Advantageously, both the interior and the exterior surfaces and the surfaces of any open pores of the inorganic oxide substrates treated in accordance with the present method can be substantially covered with a cladding of carbon. By "low pressure," it is meant that the pressure of the vaporized carbon source in the deposition chamber will be preferably less than about 50 Torr, and more preferably less than about 20 Torr. Since the system pressure in the deposition chamber prior to introduction of the vaporized carbon source will preferably be less than about 10 Torr, the total pressure during the deposition will preferably be less than about 60 Torr, and more preferably less than about 30 Torr.

The preferred temperature to be maintained during deposition of carbon according to the present method ranges from about 500°–1500° C., and more preferably is about 600°–1000° C. The preferred deposition time is from about 1 minute–4 hours (240 minutes), but more preferably is between 15 minutes–1 hour. It is believed that the present method advantageously provides inorganic oxide spherules with a much more complete and uniform surface coverage in a shorter period of time than conventional CVD techniques.

The inorganic oxide spherules which are preferably utilized in the present method will have a diameter of about 1–500 microns, a surface area of about 5–300 m$^2$/g, and, if porous, a pore diameter of about 20–5000 Å. Although any inorganic oxide meeting these criteria may be employed as a core or substrate material in practice of the present method, preferred inorganic oxides include those commonly employed in sorbent applications, e.g., $SiO_2$, $TiO_2$, $Al_2O_3$, MgO, and $ZrO_2$. Suitable $SiO_2$ spherules are commercially available under the trade name HPLC Silica Nucleosil, from Macherey-Nagel (Germany). For liquid chromatography applications, a metal oxide which displays a relatively high resistance to dissolution in aqueous media is preferably employed. Suitable metal oxides in this group include, but are not limited to, $Al_2O_3$, $TiO_2$, $HfO_2$ or $ZrO_2$, with $ZrO_2$ and $HfO_2$ being most preferred metal oxides because of their high resistance to dissolution. Suitable $Al_2O_3$ spherules are commercially available under the trade name Spherisorb Alumina from Phase Sep, Inc., Hauppauge, N.Y. Suitable $TiO_2$ spherules can be prepared as disclosed in U.S. Pat. No. 4,138,336. Compounds or mixtures of more than one inorganic oxide may also be employed in the present method as the core or substrate material.

Any carbon source which can be vaporized and which will carbonize on the surface of the inorganic oxide substrate under the temperature and pressure of the present method may be employed to deposit a carbon cladding via CVD. Useful carbon sources include hydrocarbons such as aromatic hydrocarbons, e.g., benzene, toluene, xylene, and the like; aliphatic hydrocarbons, e.g., heptane, cyclohexane, substituted cyclohexane butane, propane, methane, and the like; unsaturated hydrocarbons; branched hydrocarbons (both saturated and unsaturated), e.g., isooctane; ethers; ketones; aldehydes; alcohols such as heptanol, butanol, propanol, and the like; chlorinated hydrocarbons, e.g., methylene chloride, chloroform, trichloroethylene, and the like; and mixtures thereof. Another useful carbon source may be a gaseous mixture comprising hydrogen and carbon monoxide, as described by P. Winslow and A. T. Bell, *J. Catalysis*, 86, 158-172 (1984), the disclosure of which is incorporated by reference herein.

The carbon source may be either a liquid or a vapor at room temperature and atmospheric pressure although it is employed in the CVD process in vapor form. If the carbon source is a liquid with low volatility at room temperature, it may be heated to produce sufficient vapor for the deposition.

In general, the choice of the optimum deposition temperature, pressure and time conditions are dependent on the carbon source employed and the nature of the metal oxide. For example, higher hydrocarbon vapor pressures, higher deposition temperatures and longer deposition times will generally lead to increased amounts of carbon being deposited. Higher deposition temperatures and higher total pressures will, however, also result in a greater tendency for deposition to be localized on or near to the peripheral surface of the substrate particles. If such increased deposition on the exterior surface restricts access of the hydrocarbon vapor to the surfaces of the pores of the particle, these internal surfaces may be poorly coated and therefore their chromatographic performance impaired. Furthermore, the restricted access to the pores may also reduce the chromatographic utility of the particle. Thus, it is preferable to optimize deposition conditions so that the carbon cladding substantially and evenly covers both the external surface and the surfaces of the pores, and does not restrict the subsequent access of hydrocarbon to the surface of the pores. This condition is favored by lower deposition temperatures, e.g., 500°-1000° C. and lower total pressures, e.g., 1-50 Torr. Since lower deposition temperature and pressure results in a slower rate of carbon deposition, longer deposition times will be employed in order to deposit a layer of carbon adequate to cover the surface of the particle. Therefore, the optimum conditions may require a compromise between degree of surface coating and length of deposition time. Advantageously, the present method results in substantially complete surface coverage of the inorganic oxide spherules, i.e., at least about 75%, preferably at least about 90%, and more preferably at least about 95% of the surface will be covered.

A suitable apparatus for carrying out the present method utilizing chemical vapor deposition is shown schematically in FIG. 1 by reference numeral 10. In an application of the present method, a sample 12 of inorganic oxide spherules is placed in sample boat 14, and centrally positioned within a tubular reaction chamber 16 (cross-section not shown). Tubular reaction chamber 16 is situated substantially cocentrically within tubular furnace 18, which has a first end 20 and a second end 22. Tubular furnace 18 also includes means for maintaining the sufficiently high temperature, e.g., 500°-1500° C., within the tubular furnace, for chemical vapor deposition.

Connected to both first end 20 and second end 22 of tubular reaction chamber 16 are end fittings 24. The end fitting 24 connected to second end 22 is an "O"-ring joint which provides means for connecting second end 22 to a winch 26, while end fitting 24 connected to first end 20 of tubular reaction chamber 16 is an "O"-ring joint which provides means for connecting first end 20 to an inner quartz tube 28. After chemical vapor deposition is completed, sample 12 in sample boat 14 may be removed from reaction chamber 16 without breaking a vacuum seal by means of an arrangement consisting of a temperature-resistant thread 32 connected to winch 26.

The pressure within tubular reaction chamber 16 can be reduced to below atmospheric pressure by means of vacuum system, shown generally as reference numeral 30. The pressure may be measured by vacuum sensor 40 and indicated by vacuum gauge 42, or by any other suitable means. In more sophisticated apparatuses, it is envisioned that a feedback control system could receive an input signal from vacuum sensor 40 and would control pressure by adjusting the vacuum pump operation accordingly. Additionally, means of monitoring the flow of vapor into the reaction chamber would be provided. Preferably, means for agitating the sample of spherules during the deposition process would be provided to ensure more thorough coating uniformity.

Inner quartz tube 28 is connected to vacuum tubing 34 which is in turn connected to a flask 36 containing a carbon source 38. The temperature of carbon source 38 is maintained by a water bath in which flask 36 is immersed or by other suitable means known in the art. It is preferred that the carbon source 38 and the water of the water bath are both stirred to maintain a constant temperature. Carbon source vapor is carried through vacuum tubing 34 and inner quartz tube 28 into reaction chamber 16, where it decomposes upon contact with sample 12 maintained at an elevated temperature, e.g., 500°-1500° C., within the reaction chamber. Thus, a thin cladding of carbon is deposited on the surface of the porous inorganic oxide spherules of sample 12.

After their preparation according to the present method, the carbon-clad spherules may be packed into a chromatography column and used to perform liquid chromatographic separations. Conventional slurry packing techniques can be employed to pack LC columns with the spherules. For a general discussion of LC techniques and apparatuses, see *Remington's Pharmaceutical Sciences* A. Osol, ed., Mack Publishing Col, Easton, Pa. (16th ed. 1980), at pages 575-576, the disclosure of which is incorporated by reference herein.

The invention will be further described by reference to the following detailed Examples. The Examples are directed to the following subject matter:

| | |
|---|---|
| Examples 1-8 | Preparation of Core $ZrO_2$ Spherules |
| Examples 9-17 | Carbon Cladding by Low Pressure CVD Method |
| Examples 18-19 | Chromatographic Studies Utilizing Carbon-Clad $ZrO_2$ as Stationary Phase |
| Examples 20-23 | Chromatographic Studies Comparing Silica and Carbon-Clad $ZrO_2$ Stationary Phases |
| Example 24 | Comparison of Aromatic and Aliphatic Hydrocarbon Carbon Sources for CVD |
| Example 25 | Comparison of Alcohol and Aliphatic Hydrocarbon Carbon Sources for CVD |

EXAMPLE 1

Preparation of Core $ZrO_2$ Spherules

Peanut oil (3 liters) was placed in a 4 liter beaker and heated to 90° C. A mechanical agitator was inserted and the peanut oil was vigorously stirred. One hundred grams of Nyacol ™ Zr 95/20, a colloidal $ZrO_2$ manufactured by Nyacol, Inc., Ashland, Mass., and containing 20 wt-% of $ZrO_2$, primarily as about 95 nm particles, was sprayed into the peanut oil through an aerosol atomizer. After approximately 30 minutes, the batch was filtered through a No. 54 Whatman filter. Approximately 17 g of solids were recovered, which were predominately spherules having a diameter of <30 μ.

EXAMPLE 2

Preparation of Core ZrO₂ Spherules

Peanut oil (600 g) and 600 g of oleyl alcohol were mixed and heated to about 90° C. Under vigorous agitation, 100 g of Nyacol ™ Zr 95/20 was sprayed into the peanut oil/oleyl alcohol mixture as described in Example 1. After 30 minutes, the batch was filtered and the particles collected. The particles were predominately (ca: 70%) spherules having a diameter of <50 μ.

Spherules prepared as described in Examples 1 and 2 were thermally treated at a series of temperatures and the surface area, average pore diameter and pore volume as a percentage of total volume were measured by nitrogen adsorption isotherm on a Quantasorb surface area analyzer. These results are summarized in Table 2-1, below.

TABLE 2-1

| Physical Characteristics of $ZrO_2$ Spherules | | | |
|---|---|---|---|
| Firing Temp (°C.)* | Surface Area (m²/g) | Average Pore Diameter (Å) | Pore Volume (%) |
| 400 | 142 | 42 | 47 |
| 500 | 92 | 71 | 50 |
| 600 | 34 | 110 | 36 |
| 800 | 17 | 205 | 34 |
| 900 | 14 | 220 | 31 |

*6 hrs

The data summarized in Table 2-1 show that it is possible to increase the average pore diameter by increasing the firing temperature from 400° to 900° C. The surface area and pore volume decrease with increasing firing temperature. Since chromatographic capacity of the ZrO₂ spherules is determined by the surface area, average pore diameter and pore volume, the appropriate firing temperature can be selected to control these parameters.

EXAMPLE 3

Preparation of Core ZrO₂ Spherules

The procedure of Example 2 was employed to prepare spherules using Nyacol ™ Zr 50/20, a colloidal ZrO₂ supplied by Nyacol, Inc. (50 nm ZrO₂ colloidal size) as the ZrO₂ source.

EXAMPLE 4

Preparation of Core ZrO₂ Spherules

The procedure of Example 2 was used to prepare spherules using Nyaco ™ Zr 150/20, a colloidal ZrO₂ supplied by Nyacol, Inc. (150 nm ZrO₂ colloid size) as the ZrO₂ source.

Table 4-1 summarizes the surface area, average pore diameter and pore volume of spherules prepared as per Examples 2-4 and fired at 600° C. for 6 hrs.

TABLE 4-1

| Physical Charteristics of $ZrO_2$ Spherules | | | | |
|---|---|---|---|---|
| ZrO₂ Source* | ZrO₂ Colloid Size (nm) | Surface Area (m²/g) | Average Pore Diameter (Å) | Pore Volume (%) |
| Zr 50/20 | 50 | 33 | 92 | 31 |
| Zr 95/20 | 95 | 34 | 110 | 36 |

TABLE 4-1-continued

| Physical Charteristics of $ZrO_2$ Spherules | | | | |
|---|---|---|---|---|
| ZrO₂ Source* | ZrO₂ Colloid Size (nm) | Surface Area (m²/g) | Average Pore Diameter (Å) | Pore Volume (%) |
| Zr 150/20 | 150 | 40 | 147 | 45 |

*Nyacol ™ series.

The data summarized in Table 4-1 show that it is possible to control the average pore diameter of the fired spherules by appropriate selection of the colloid size of the ZrO₂ source. Larger colloids produce fired spherules with larger pore diameters and pore volumes.

EXAMPLE 5

Preparation of Core ZrO₂ Spherules with Single Centrifugation

Nyacol ™ Zr 95/20 colloidal ZrO₂ was placed in a laboratory centrifuge and sedimented. The supernatant was decanted and discarded. The sedimented ZrO₂ was redispersed in an equal volume of distilled water. Spherules were prepared from this centrifuged sol following the procedures of Example 2.

EXAMPLE 6

Preparation of Core ZrO₂ Spherules with Double Centrifugation

The centrifugation procedure of Example 5 was performed and the redispersed sol was subsequently recentrifuged to sediment, the supernatant decanted off and the ZrO₂ redispersed. Spherules were prepared from this doubly centrifuged sol following the procedure of Example 2.

EXAMPLE 7

Preparation of Core ZrO₂ Spherules with Triple Centrifugation

The double centrifugation procedure used in Example 6 was performed and the redispersed sol was subsequently recentrifuged to sediment, the supernatant decanted and the ZrO₂ redispersed. Spherules were prepared from this triply centrifuged sol following the procedures of Example 2.

Table 7-1 summarizes the surface area, pore diameter and pore volume of spherules prepared as per Examples 2, 5, 6 and 7 and heated to 600° C. for 6 hrs.

TABLE 7-1

| Physical Characteristics of $ZrO_2$ Spherules | | | |
|---|---|---|---|
| ZrO₂ Source* | Surface Area (m²/g) | Average Pore Diameter (Å) | Pore Volume (%) |
| Zr 95/20 | 34 | 110 | 36 |
| Zr 95/20 cent. (1x) | 50 | 162 | 55 |
| Zr 95/20 cent. (2x) | 52 | 235 | 62 |
| Zr 95/20 cent. (3x) | 46 | 250 | 62 |

*Nyacol ™ Zr series.

Centrifugation, removal of the supernatant, and redispersion of the colloidal ZrO₂ starting material results in increases in the average pore diameter, pore volume and surface area of fired spherules. This increase is believed to result from the removal of small (ca. 5-10 nm) colloidal ZrO₂ particles which are known to be present in the Nyacol ™ Zr series sols as a minor component. Many of these smaller ZrO₂ particles remain suspended during centrifugation and are removed when the supernatant is discarded prior to redispersion of the larger sedimented $ZrO_2$ particles. If present, these small $ZrO_2$ particles are believed to increase the packing density of the spherules by filling the interstices between larger $ZrO_2$ particles and therefore decreasing the average pore diameter, pore volume and surface area of the fired spherules.

It is also possible that sedimentation by centrifugation may result in agglomeration of the colloidal $ZrO_2$ particles into aggregates which pack together in a more open structure (effectively behaving as larger particles) than unaggregated particles.

Regardless of mechanism, the centrifugation treatments described in Examples 5-7 provide a method of preparing spherules with increased average pore diameter, pore volume and surface area relative to spherules prepared from untreated colloidal $ZrO_2$ sols.

EXAMPLE 8

Preparation of Core $ZrO_2$ Spherules With Spray Drying

Preparation A

A 4500 g sample of Nyacol TM Zr 100/20, which contained 20 wt-% $ZrO_2$ primarily as about 100 nm particles, was concentrated on a rotary evaporator until its concentration was 35% $ZrO_2$ by weight. This sol was then spray dried on a spray drier manufactured by Nyro Incorporated. About 900 g of dried solids were obtained. When examined under an optical microscope, the solids were observed to be spherules from about 0.5 to 30 $\mu$ in diameter. The dried spherules were fired by heating them in a furnace to a temperature of 600° C. over 6 hours, with additional heating applied at a constant temperature of 600° C. for 6 more hours. Nitrogen adsorption measurements on the fired $ZrO_2$ spherules indicated that their average surface area was 48.1 $m^2/g$ and their average pore diameter was 116Å. The spherules were air classified, and the fraction ranging in size from approximately 5-10 $\mu$ was subsequently used for chromatography experiments.

Preparation B

To prepare spherules with larger diameter pores than those of Preparation A, the procedure described below was followed. 1200 g of Nyacol TM Zr 100/20 colloidal $ZrO_2$ were centrifuged on a laboratory centrifuge at 5000 rpm for 55 minutes. The supernatant was discarded and the sediment was re-dispersed in distilled water. The centrifuged sol was placed on a rotary evaporator and concentrated until it contained 35% by weight of $ZrO_2$. Following spray drying of the sol under conditions similar to those described in Preparation A, about 300 g of dried solids were obtained. When examined under an optical microscope, the solids were observed to be spherules ranging in size from about 1 to 30 $\mu$ in diameter. Many of the spherules (>50%) were observed to possess cracks, especially those spherules of larger size.

A portion of the fired spherules was then placed in a furnace and heated to a temperature of 1100° C. over 9 hours, with additional heating at a constant temperature of 1100° C. for 6 more hours. The surface area of the fired spherules was determined to be 16.1 $m^2/g$, and the average pore diameter was 408 Å, as measured by mercury porosimetry. This technique is a preferred method for measuring the size of pores greater than about 250 Å in diameter. The fired spherules were unchanged in appearance from the dried spherules. They were nearly all intact, but many (>50%) were cracked.

A portion of the fired spherules was classified by size fraction as described in Preparation A. Examination of the classified fractions indicated that a portion of the spherules had fractured during the classification procedure. Many intact spherules remained, but a portion of each fraction contained irregularly shaped particles which appeared to have been produced by the fracturing of the spherules during the classification process.

Preparation C

To prevent the cracking observed in the spherules prepared according to Preparation B, spherules were also prepared as follows: 1250 g of Nyacol TM Zr 100/20 colloidal $ZrO_2$ were placed in a laboratory centrifuge and spun at 5000 rpm for 55 minutes. The supernatant was discarded and the sediment was re-dispersed in distilled water. This centrifuged sol was placed on a rotary evaporator and concentrated until the concentration of $ZrO_2$ in the sol was 32 wt %. To 513 g of this sol were added 34.6 g of a solution of zirconyl acetate containing 25% by weight $ZrO_2$ equivalent (Harshaw, Inc., Cleveland, Ohio), and 61 g of a solution containing 50 wt % PVP K30, a polyvinylpyrrolidone polymer (GAF Corporation, Texas City, Tex.) were added to the concentrated sol. The resulting mixture was then agitated rapidly into a 50/50 mixture of peanut oil and oleyl alcohol which had been heated to a temperature of 90° C. The resulting mixture contained gelled spherules of about 1 to 30 $\mu$ in diameter, which were observed under an optical microscope to be intact and crack-free.

The spherules were then fired to a temperature of 900° C. over 7 hours and 20 minutes, with heating at a constant temperature of 900° C. for an additional 6 hours. After firing, the resulting spherules were from about 1 to 25 $\mu$ in diameter, and were observed under an optical microscope to be intact and crack-free. The surface area and average pore diameter of these microspheres were measured by mercury porosimetry to be 28 $m^2/g$ and 415 Å, respectively. A portion of these spherules was classified into 5-10 $\mu$ and 10-20 $\mu$ fractions by sieving. Following classification, the classified spherules remained uncracked and intact.

EXAMPLE 9

Chemical Vapor Deposition of Carbon on Core $ZrO_2$ Spherules (Toluene as Carbon Source)

In order to deposit a thin film or cladding of carbon over the zirconia substrate, "bare" or unclad $ZrO_2$ spherules were treated as follows.

15 g of porous $ZrO_2$ spherules, prepared according to the procedure of Example 8A above, which had a diameter of about 8 u and a surface area of 56.5 $m^2/g$ and an average pore diameter of 90 Å, were placed in a ceramic sample boat. The boat was placed in a reaction chamber within a small tube furnace similar to that shown in FIG. 1. The vacuum pump of the system was engaged, and the total system pressure was lowered to about 1 Torr (1 mm mercury). The furnace was then heated to a temperature of 700° C. After equilibrating at 700° C. for about 1 hour, the valve to the flask containing toluene at 22° C. was opened slightly, allowing toluene vapor to enter the reaction chamber. With this valve open, the total pressure in the system rose to about 8 Torr, as measured by the vacuum gauge. This gauge is calibrated to measure $N_2$ partial pressures. The effect of measuring the pressure of vapors such as toluene on the accuracy of the gauge is not known, but the gauge was used as a means of measuring the relative pressures used in the preparation of samples, instead of absolute pressures. The limits on the pressure of toluene are 0 Torr with the valve closed, to 23 Torr, which is the vapor pressure of toluene at 22° C. The pressure was maintained at a gauge reading of about 8 Torr for 10 minutes. During this time, the originally white $ZrO_2$ spherules turned black in color due to the deposition of carbon on their surfaces.

After 10 minutes of deposition, the boat was removed from the furnace but kept in the reaction chamber under vacuum by using a winch as shown in FIG. 1 to pull the sample from the furnace. After a cooling time of about 15 minutes, the spherules were removed from the reaction chamber and inspected. By visual observation, the spherules were free-flowing and undamaged by the low pressure CVD treatment. The specific surface area and average pore diameter of the spherules were measured and found to be 38.7 $m^2/g$ and 113 Å, respectively.

EXAMPLE 10

Effect of Varying Deposition Time at 700° C.

This example describes an experiment designed to determine the effect of deposition time on amount of carbon deposited and spherule surface area under constant deposition conditions. Four tests were completed in which samples of $ZrO_2$ spherules underwent CVD of carbon for 5, 10, 20 and 25 minutes, respectively. Each of the four samples consisted of 4 g of porous $ZrO_2$ spherules, prepared according to the procedure of Example 8A above, having a particle size of about 1–10 u and a surface area of 48 $m^2/g$. Each sample was placed in a sample boat similar to that shown in FIG. 1, which was then placed in the reaction chamber that had been heated to 700° C. in the tubular furnace according to Example 9. The system pressure was lowered to about 2 Torr by operation of the vacuum pump. After equilibrating for 10 minutes, the valve to the flask containing toluene was opened slightly, thus allowing toluene vapor to enter the reaction chamber, until the total system pressure rose to a vacuum gauge reading of about 5 Torr. This valve setting and temperature were maintained for the varying lengths of time shown in Table 10-1 below. Each sample was then removed from the furnace, but kept within the reaction chamber under vacuum until the sample had cooled, about 15 minutes. After cooling, the surface area and the weight percent carbon and hydrogen of each sample were measured, and are listed below in Table 10-1.

TABLE 10-1

| Deposition Time (min.) | Surf. Area ($m^2/g$) | Wt % C | Wt % H |
|---|---|---|---|
| 5 | 50 | 1.4 | 0.1 |
| 10 | 45 | 3.7 | 0.1 |
| 20 | 34 | 5.4 | 0.2 |
| 25 | 36 | 6.8 | 0.2 |

These results show that at a constant deposition temperature and pressure, the weight percent of the carbon coating increases, and the surface area, in general, decreases with increasing deposition time.

EXAMPLE 11

Effect of Varying Deposition Time at 775° C.

This example describes the effect of varying the deposition time at 775° C., at a toluene vapor pressure of about 23 Torr as measured by a vacuum gauge, on the surface area of $ZrO_2$ spherules. 5 g of $ZrO_2$ spherules prepared according to Example 2 and fired to 600° C., and having a surface area of 61 $m^2/g$ and an average pore diameter of 96 Å, were placed in a sample boat which was placed in the reaction chamber as described in Example 10, with the exception that the temperature was maintained at 775° C. The pressure of the system was reduced to about 4 Torr with the vacuum pump, and the system allowed to equilibrate for about 10 minutes. When the valve leading to the flask which contained toluene was opened, the total system pressure as measured by the vacuum gauge rose to about 27 Torr due to the presence of the toluene vapor. On contact with the heated sample, the toluene vapors decomposed, resulting in the deposition of a carbonaceous layer on the $ZrO_2$. Following decomposition for the times shown in Table 11-1 below, the samples were removed from the furnace but left in the reaction chamber under vacuum by winching from the furnace. After cooling in the quartz tube under vacuum for about 15 minutes, the surface area and average pore diameter of each sample was measured. Table 11-1 shows the results of these experiments.

TABLE 11-1

| Deposition Time (min.) | Surf. Area ($m^2/g$) | Avg. Pore Dia. (Å) |
|---|---|---|
| 2 | 38 | 112 |
| 5 | 38 | 102 |
| 10 | 31 | 101 |

The data in Table 11-1 show that surface area and the average pore diameter of the pores decreases with increasing deposition time.

EXAMPLE 12

Effect of Varying Deposition Temperature and Pressure

This example describes the deposition of the carbon layer at different conditions of temperature and toluene partial pressure. Two samples, each comprising 8 g of porous $ZrO_2$ spherules prepared according to Example 8A above, were placed in a sample boat that was placed in the reaction chamber maintained at the deposition temperatures shown in Table 12-1 below. The system pressure was then lowered with the vacuum pump to about 2 Torr. After equilibrating the system for 10 minutes, the valve to the toluene flask was opened, thus allowing toluene vapor to enter the reaction chamber. Deposition continued for the times shown in Table 12-1. After cooling under vacuum for about 15 minutes, the surface area, weight percent carbon, and weight percent hydrogen of each sample were measured, and are listed in Table 12-1 below.

TABLE 12-1

| Temp. (°C.) | Time (min.) | Surf. Area ($m^2/g$) | Wt % C | Wt % H |
|---|---|---|---|---|
| 1000 | 8 | 6.5 | 8.1 | 0.1 |
| 500 | 17 | 46.0 | 0.5 | 0.1 |

By visual observation, the 1000° C. sample was black in color, while the 500° C. sample was tan in color. During deposition at 1000° C., a black deposit was also noted on the exit end of the reaction chamber. This experiment showed that the rate of carbon deposition increases with increasing deposition temperature.

EXAMPLE 13

Preparation of Carbon-Clad $SiO_2$ and $Al_2O_3$ Spherules (Toluene as Carbon Source)

This example describes treatment of porous $SiO_2$ and $Al_2O_3$ spherules by the low pressure CVD method to prepare carbon-clad $SiO_2$ and $Al_2O_3$. The base silica spherules employed were HPLC Silica Nucleosil, from Macherey-Nagel (Germany) which had a 15–25 u particle size. The base alumina spherules employed were SPHERISORB ALUMINA, obtained from Phase Sep Inc., Hauppauge, N.Y., which had about a 10 u particle size. For each of three tests, a 0.9 g sample of spherules was placed in a sample boat and the boat was positioned in the quartz tubular reaction chamber at the selected temperature shown in Table 13-1 below. The pressure in the reaction chamber was reduced to 5 Torr with a vacuum pump, and the system was allowed to equilibrate for 10 minutes. The valve to the flask containing the toluene carbon source was then opened and the total pressure raised to a vacuum gauge reading of about 9 Torr due to the introduction of the toluene vapor. After deposition for the time periods indicated in Table 13-1 below, each sample was allowed to cool under vacuum for about 15 minutes and its surface area, weight percent carbon and weight percent hydrogen were measured. The results are listed in Table 13-1, below.

TABLE 13-1

| Sample | Temp. (°C.) | Time (min.) | Color | Surf. A ($m^2/g$) | Wt % C | Wt % H |
|---|---|---|---|---|---|---|
| $SiO_2$ | 700 | 10 | white | 103 | 0.4 | <0.1 |
| $SiO_2$ | 800 | 10 | black | 80 | 2.0 | <0.1 |
| $Al_2O_3$ | 700 | 10 | black | 113 | 4.2 | 0.6 |

The results indicate that the present low pressure CVD method is useful for carbon cladding other inorganic oxides besides $ZrO_2$. However, the data of Table 13-1 indicate that a higher temperature (i.e., greater than 700° C) may be required to effect equivalent levels of carbon deposition from toluene onto $SiO_2$, than the temperature required to effect carbon deposition onto $Al_2O_3$ or $ZrO_2$ (less than or up to about 700° C.).

EXAMPLE 14

Reductive Treatment of $ZrO_2$ Carbon-clad Spherules

This example describes heat treatment of carbon-clad $ZrO_2$ spherules prepared according to Example 9 while exposing them to a reducing atmosphere. The purpose of the heat treatment was to cause the reduction of polar functional groups on the carbon-clad surface of the spherules, thereby modifying chromatographic performance by increasing the homogeneity of the surface of the spherules.

A 20 g sample of carbon-clad $ZrO_2$ spherules prepared according to Example 9 (toluene hydrocarbon source) was placed in an $Al_2O_3$ sample boat inside of a mullite tubular reaction chamber with gas tight seals on both ends. The reaction chamber was then placed within a tubular furnace, in accordance with the arrangement depicted in FIG. 1. The sample of $ZrO_2$ spherules was exposed to a gaseous reducing mixture of 95% $Ar$/5% $H_2$ by flowing this mixture through the reaction chamber. After allowing the system to equilibrate for about 30 minutes, the sample was heated to a temperature of 700° C. over 2 hours, and thereafter maintained at 700° C. for an additional hour. At the end of the third hour, the furnace was shut off and the samples allowed to cool in the tube, still under the flow of 95% $Ar$/5% $H_2$.

EXAMPLE 15

Use of n-Heptane as Carbon Source

This example describes the use of n-heptane, rather than toluene, as the carbon source for the present low pressure CVD process. A 9 g sample of $ZrO_2$ spherules prepared according to Example 8A, which had a diameter of about 5 u, a surface area of 40 $m^2/g$, and an average pore diameter of about 164 Å, were placed in a sample boat similar to that shown in FIG. 1. The boat was positioned in the quartz tubular reaction chamber as in the previous Examples. The system was equilibrated at a temperature of 700° C. and a pressure of about 1 Torr for 10 minutes. The valve to the flask containing n-heptane was then opened slightly, bringing the total system pressure to about 5 Torr as measured by the vacuum gauge, due to the presence of n-heptane vapor. These conditions were maintained for 20 minutes before the sample was winched from the furnace and allowed to cool under vacuum for about 15 minutes. By visual observation, the clad spherules ranged from dark grey to black in color. It was also observed that the portion of the sample located nearer to the top of the sample boat was darker in color than the portion of the sample below.

EXAMPLE 16

Effect of Repeated Carbon-cladding

This example describes experiments in which a thin cladding of carbon was deposited on a sample of $ZrO_2$ spherules as described in the previous examples, the carbon-clad sample was mixed or stirred up, and additional carbon was then deposited by repeating the CVD in order to improve coating homogeneity.

A sample of $ZrO_2$ spherules prepared according to Example 8A, which had a diameter of about 5 u, a surface area of 40 $m^2/g$, and an average pore diameter of 164 Å, were heated to a temperature of 700° C., and held at this temperature for 6 hours prior to the cladding procedure. Two tests were performed, one employing toluene as the carbon source, the other using n-heptane. The amount of carbon source vaporized during each test was determined by weighing each flask at the beginning and the end of each test. The temperature maintained in the furnace during each test was 700° C., and in both tests the original system pressure was about 6 Torr. Each sample underwent carbon vapor deposition for 15 minutes, cooling for 15 minutes, thorough mixing of the sample, and a second carbon vapor deposition for another 15 minutes. After cooling for about 15 minutes following the second carbon deposition, the surface area, weight percent carbon, and weight percent hydrogen of each sample were analyzed, and are listed in Table 16-1 below.

TABLE 16-1

| CARBON SOURCE | WEIGHT VOLATILIZED | SURFACE AREA (m²/g) | WEIGHT % C | WEIGHT % H |
|---|---|---|---|---|
| n-Heptane | 6.5 g | 24 | 1.1 | <0.1 |
| Toluene | 12.5 g | 25 | 3.1 | <0.1 |

EXAMPLE 17

Determination of Exposed Zirconia

A technique was developed to determine the amount of bare $ZrO_2$ remaining exposed, i.e., not clad with carbon, after carrying out the CVD process of the present invention on $ZrO_2$ spherules. The technique is based on the known strong adsorption of phosphate ions on $ZrO_2$ surfaces. More specifically, the amount of remaining exposed zirconia was determined by monitoring phosphate removal from a solution in contact with the carbon-clad zirconia spherules as follows:

In a static adsorption study, a 0.1 g sample of carbon-clad spherules which had been prepared according to Example 9 above was placed in a clean 30 ml polyethylene bottle. A 2 mM to 10 mM standard solution of phosphate was prepared from phosphoric acid and water having a resistivity of greater than 16 megaohms. Twenty ml of the phosphate solution were added to the polyethylene bottle, and a vacuum was applied with sonication to completely wet the pores of the spherules. The mixture of spherules in phosphate solution was then agitated every 30 min for the next 6 to 8 hours. Following agitation, the mixture was allowed to stand for 20-24 hours. At the end of the standing period, the phosphate solution was removed from the polyethylene bottle with a 10 ml glass syringe and passed through a 0.2 um filter to remove any remaining zirconia particles.

The filtered solutions and blanks (standard phosphate solutions) were analyzed for phosphorous using Inductively Coupled Plasma Spectroscopy (ICPS). The amount of phosphorous that had adsorbed to the spherules was determined by the difference between phosphate concentration in the standard solutions (blanks) and the filtered solutions. The ICPS analysis indicated that 90-95% of the surface area of the $ZrO_2$ substrate had been blocked from interaction with the phosphate solute by the carbon coating.

An additional technique used to determine the carbon coverage of the $ZrO_2$ spherules involved observation of the breakthrough of a UV-active organophosphate compound such as phenylphosphate through a chromatographic column.

EXAMPLE 18

Analysis of Carbon-clad $ZrO_2$ Spherules

A. Column Packing

A 5×0.46 cm HPLC column was packed with the carbon-clad $ZrO_2$ spherules of Example 9 (toluene carbon source) using an upward slurry technique. This technique involved the use of (i) a first slurry solvent such as hexane or tetrahydrofuran (THF) to suspend the packing material; and (ii) a relatively viscous, miscible solvent such as isopropanol or methanol to displace the slurry into the column. In this manner, the column could be tightly packed at a relatively low flow rate, e.g., up to about 5 ml/min, once the column bed had been established. The column was packed at a pressure of about 6000-9000 psi. Utilization of the lower flow rate (5 ml/min) at these pressures advantageously avoided any significant amount of solvent consumption.

B. Chromatographic Nature

In order to test the chromatographic nature of the carbon-clad support material of the present invention, a chromatographic study was performed using a 5×0.46 cm HPLC column packed with the carbon-clad $ZrO_2$ spherules of Example 9 (toluene carbon source) as the stationary phase. A 70/30 (% v/% v) tetrahydrofuran/water solution at 35° C. was used as the mobile phase.

Figures 2A, 2B:
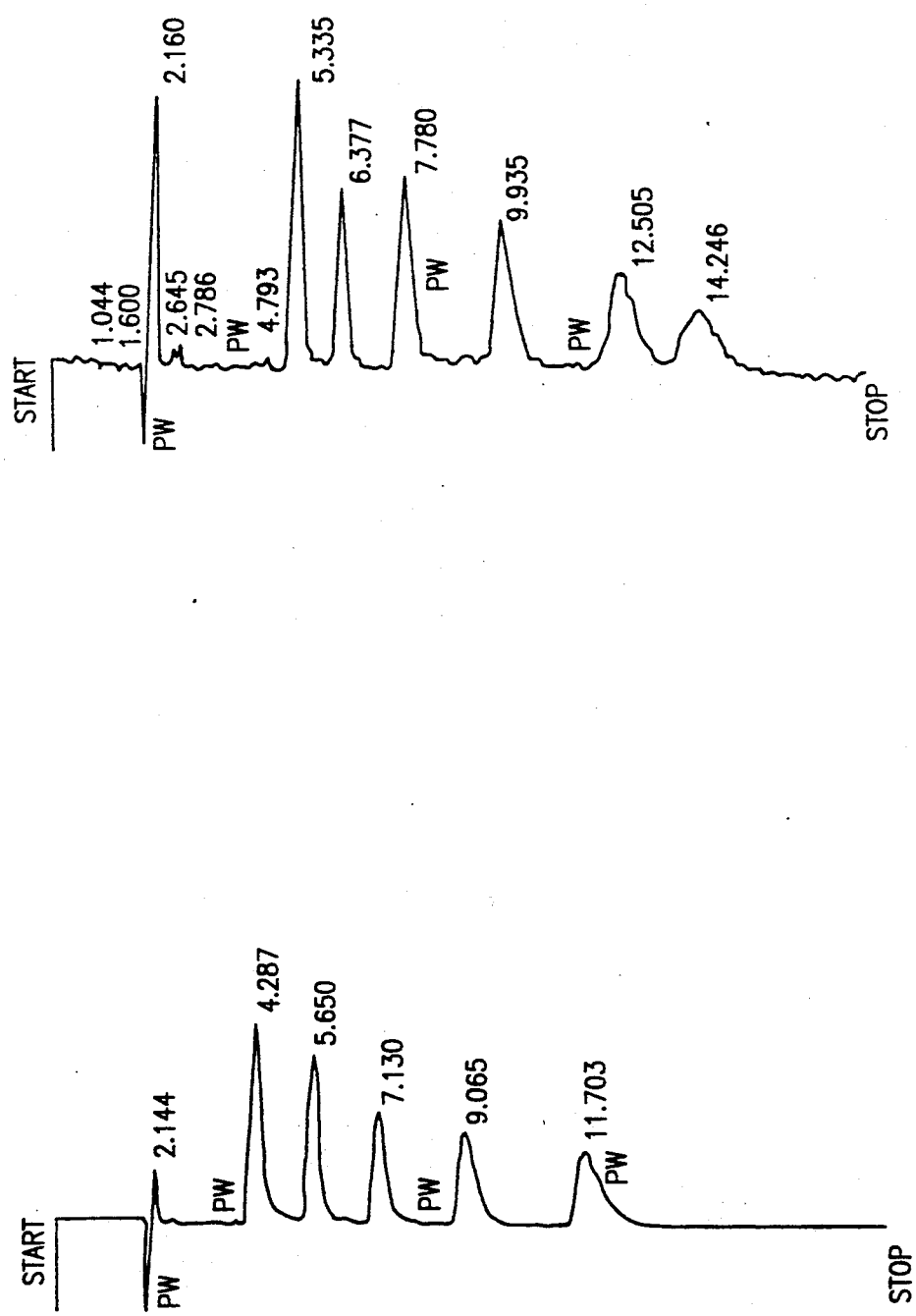
FIG. 2A shows a chromatogram of a mixture of alkylbenzenes.
FIG. 2B shows a chromatogram of a mixture of alkylphenones.

A 5 μl sample of a mixture of alkylbenzenes was injected onto the packed HPLC column. The resulting chromatogram is shown in FIG. 2a. After completion of the separation of the alkylbenzenes, a 5 μl sample of a mixture of alkylphenones was also separated on the column, under identical conditions. The resulting chromatogram is shown in FIG. 2b. Capacity factors (i.e., the ratio of solute concentration in the stationary phase to solute concentration in the mobile phase) were calculated for each solute by evaluating the ratio $(t_r-t_o)/t_o$, where $t_r$ is retention time measured at peak maximum, and $t_o$ is column dead time measured by solvent mismatch.

Figure 3:
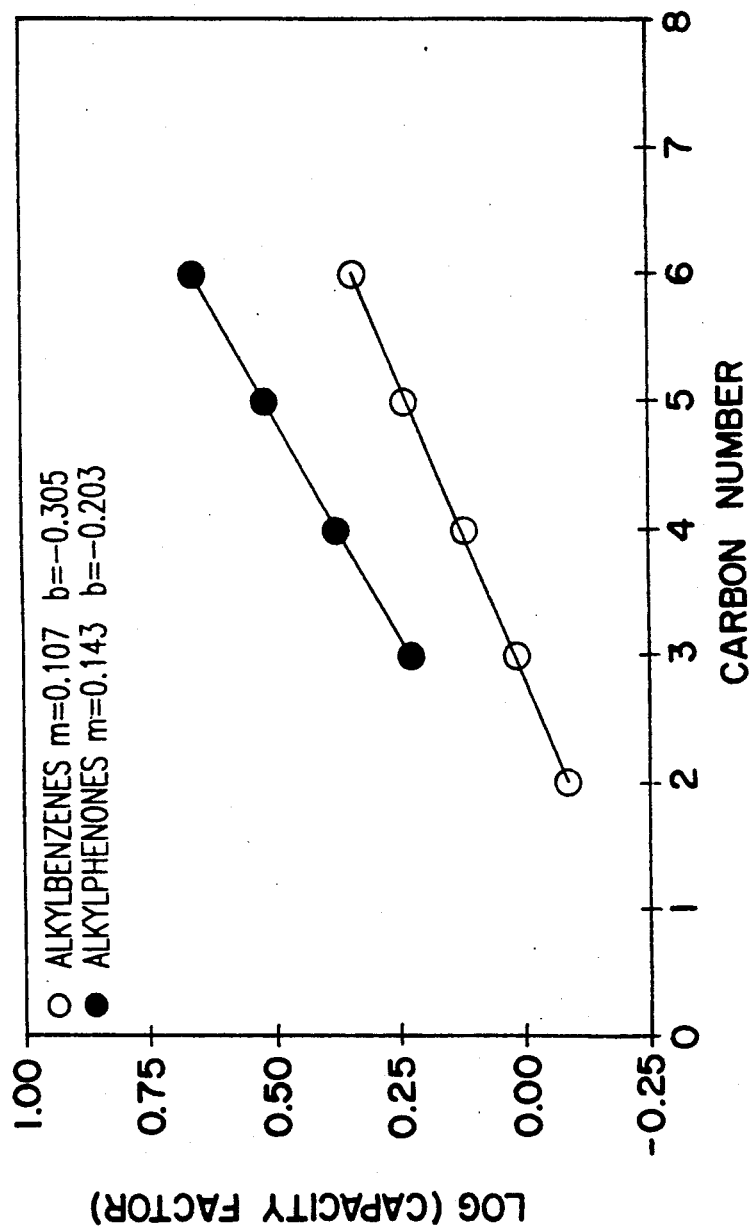
FIG. 3 depicts a plot of logarithm of capacity factor versus carbon number.

FIG. 3 depicts a plot of logarithm of the capacity factor k' vs. carbon number of the components of the alkylbenzene mixture (ethylbenzene through hexylbenzene) and for the components of the alkylphenone mixture (acetophenone through hexanophenone). As depicted in FIG. 3, the points for the homologous series fall on a straight line; the alkylphenones are more retained that the alkylbenzenes; and the slope of the log k' vs. carbon number line for the alkylphenones is slightly greater than that for the alkylbenzenes. These results indicate that the carbon-clad spherules employed as the stationary phase act as a reversed phase material. More specifically, the reversed phase character of the spherules is demonstrated by (i) the linear relationship between logarithm of the capacity factor, k', and the number of methylene groups for a homologous series of solutes; and (ii) the decreasing retention of those solutes as the mobile phase organic modifier concentration was increased.

The greater retention of the alkylphenones than the alkylbenzenes indicates the strong interaction of the present carbon-clad $ZrO_2$ with polarizable compounds, especially aromatic polarizable compounds. The greater retention of the alkylphenones than the alkylbenzenes is the converse of what is observed with bonded phase reversed phase liquid chromatography (RPLC) supports. However, greater retention of alkylphenones than alkylbenzenes is observed on carbon-based supports such as graphitized and pyrolytic carbon.

C. Alkaline Stability

Figure 4:
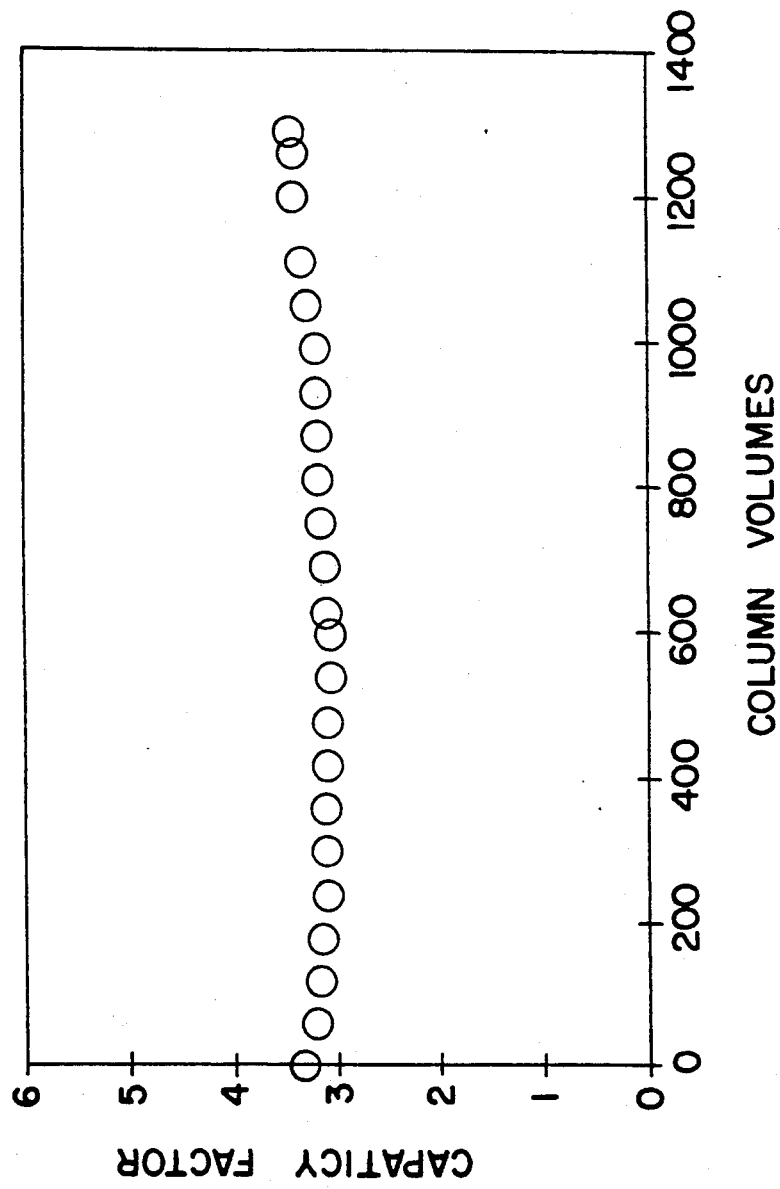
FIG. 4 shows a stability study on CVD toluene.

The alkaline stability of carbon-clad $ZrO_2$ spherules prepared according to Example 9 was tested by repeatedly injecting varying amounts of a test solute, benzene, into a 12.5×0.46 cm HPLC column packed with the spherules. A continuous flow of hot alkaline mobile phase of 50% methanol/50% pH 12 water was maintained through the column at a temperature of 80° C. and a flow rate of 0.5 ml/min. During the 60 hour study, a total of 2 liters of the alkaline mobile phase passed through the column. As shown in FIG. 4, the retention of benzene was quite constant under these conditions.

After completion of the chromatographic stability tests, the packing was removed from the column and analyzed for carbon, hydrogen, and nitrogen content. The results of the CHN analysis, depicted in Table 18-1 below, indicate that essentially none of the carbon was lost from the surface of the packing during the alkaline stability study. Thus, the CHN results confirm the results of the chromatographic stability tests.

TABLE 18-1

| Source | CHN Analysis Results[2] | | |
|---|---|---|---|
| | % C | % H | % N |
| Column Front | 3.3 | 0.2 | <0.1 |
| Column End | 3.4 | 0.2 | <0.1 |
| Column Middle | 3.3 | 0.2 | <0.1 |
| Fresh[1] | 3.4 | 0.2 | <0.1 |

[1]Fresh = not exposed to alkaline conditions.
[2]Precision of this analysis was ±0.1%.

EXAMPLE 19

Exposure of CVD Carbon-Clad $ZrO_2$ Particles to Reducing Conditions

A. Reduction of Polar Surface Groups

An experiment was performed to examine the effect on chromatographic performance of the carbon-clad (toluene carbon source) $ZrO_2$ spherules when the spherules were exposed to reducing conditions. A 30 g sample of carbon-clad $ZrO_2$ spherules was prepared, and immediately thereafter exposed to a 95% argon/5% hydrogen atmosphere at a temperature of 700° C. for 60 minutes, as described in Example 14. These conditions were expected to reduce the number of polar oxygenated sites which may be present on the carbon surface.

B. Chromatographic Nature of Reduced Material

Figure 5:
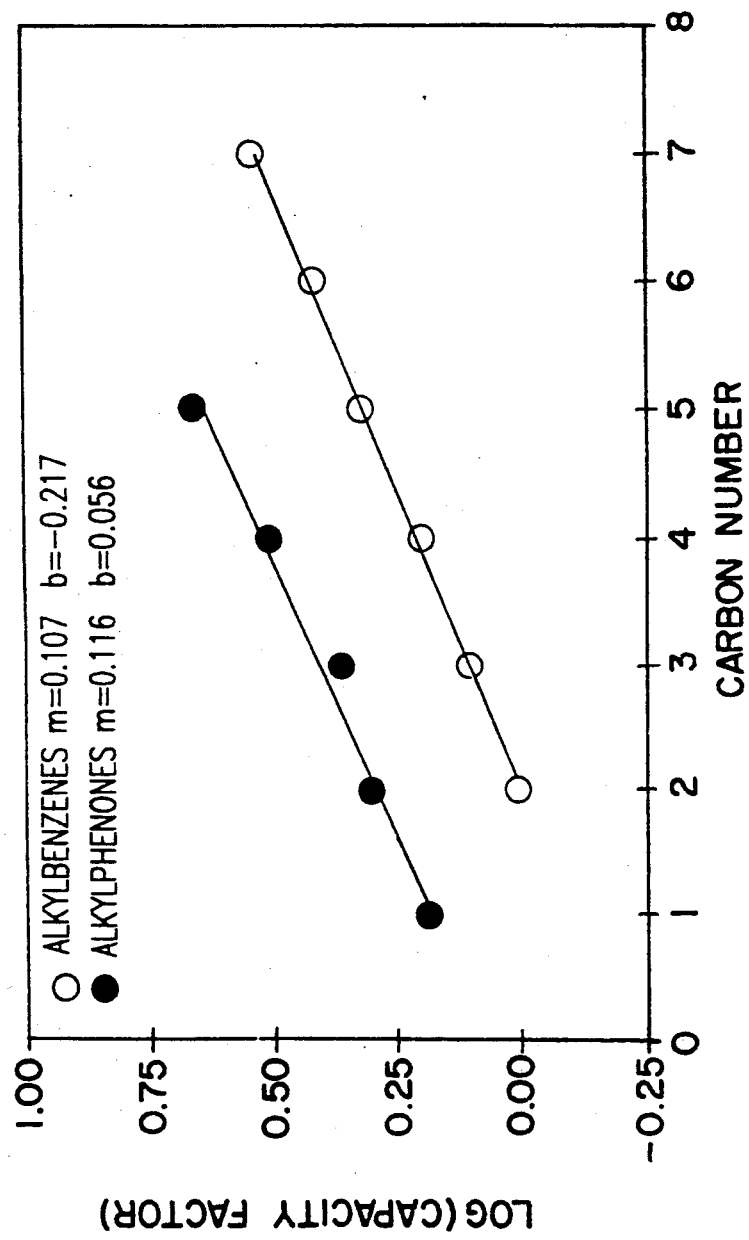
FIGS. 5 and 6 depict plots of logarithm of capacity factor versus carbon number.

The reduced material was then packed into a 15 cm×0.46 cm HPLC column with which several chromatographic studies were carried out. Packing was performed by means of the upward slurry technique described in Example 18. Separations were performed of a mixture of alkylphenones and a mixture of alkylbenzenes, using the reduced, carbon-clad zirconia as the stationary phase and a mobile phase of 70% THF/30% water. FIG. 5 depicts a plot of log(capacity factor) vs. carbon number for each alkylphenone component and alkylbenzene component of the mixture.

FIG. 5 indicates that the reduced, carbon-clad stationary phase was operating in reversed-phase mode, since the points for both homologous series fall on a straight line, and the capacity factors increase upon lowering the concentration of organic modifier in the mobile phase. Comparison of FIG. 5 with FIG. 3 indicates that reductive treatment of the carbon-clad $ZrO_2$ had little effect on capacity of the material to retain alkylbenzenes, but had a significant effect on the capacity of the material to retain alkylphenones. The slope of the log(capacity factor) vs. carbon number line for alklyphenones is less in FIG. 5 than in FIG. 3, and more closely approximates the slope of the log(capacity factor) vs. carbon number line for alkylbenzenes. These trends indicate that some of the exceptionally strong adsorption sites on the carbon surface were quenched by the reductive treatment.

In an additional experiment, the efficiency of the HPLC column, packed with the reduced carbon-clad $ZrO_2$ prepared as described in part A, was compared to the efficiency of a column packed with unreduced carbon-clad $ZrO_2$, prepared as described in Example 9. Butyrophenone was injected at a reduced velocity of 20, and a 60% THF/40% water mobile phase was maintained at 35° C. in both columns. The results indicated that chromatographic efficiency increased by 200% when the reduced support material was used as the stationary phase instead of the non-reduced support material.

In conclusion, these studies showed that the carbon-clad $ZrO_2$ spherules are a useful reversed phase support and show strong retention of nonpolar solutes and superior alkaline stability and solute selectivity. Furthermore, exposure of the carbon-clad coated $ZrO_2$ spherules to reducing conditions prior to their utilization in separations improves the efficiency of those separations.

EXAMPLE 20

Preparation of Carbon-Clad $ZrO_2$ - and Silica-Packed HPLC Columns

Carbon-clad $ZrO_2$ spherules prepared according to Example 9 above, but with a 15 minute deposition time, were evaluated as a chromatographic support material. The spherules had a ca 5 μm particle diameter, 100 Å mean pore diameter, and a specific surface are of ca 50 $m^2/g$.

The carbon-clad $ZrO_2$ support was packed into a 10×0.21 cm equipped with Kel-F encased 2 mm o.d. SS frits by the upward slurry packing technique described in Example 18. Two grams of the support material were slurried and outgassed under vacuum in 17.5 ml of a 5:1 (v/v) hexane/1-octanol solution. The resulting slurry was used to pack the column at 6000 psi using practical grade hexane as solvent. The packed column was subsequently washed with 2-propanol (IPA) and acetonitrile (ACN), and was equilibrated with water/acetonitrile (HOH/ACN) mobile phase for characterization in reversed-phase chromatography.

A 10×0.2 cm commercial Hypersil (silica) ODS (C18) column was obtained from the Hewlett-Packard Company, Avondale, Pa.

EXAMPLE 21

Comparison of Solute Retention with Varying Organic Mobile Phase Modifier Concentration on Carbon-Clad $ZrO_2$- and and Silica-Packed Columns In order to evaluate the nature of solute retention on the carbon-clad $ZrO_2$ stationary phase of Example 20, the isocratic elution of a mixture of alkyl benzene solutes was analyzed while employing HOH/ACN mobile phases of varying ACN concentration. The sample mixture of alkyl benzenes included benzene, toluene, ethyl benzene, n-propyl benzene, and n-butyl benzene (0.8 mg/m/l each in 3/2 methanol/water). One microliter injections of the sample were performed into mobile phase compositions of 65/35, 60/40, 55/45, 50/50, 45/55, 40/60, 35/65, and 30/70 v/v HOH/ACN at a flow rate of 0.500 ml/min while the column was thermostated at 40° C. Chromatographic characterization was performed on a Hewlett-Packard model 1090M HPLC system equipped with a 0.6 cm pathlength diode array absorbance detector. The elution of the solutes was detected by absorbance at 215 nm. The peak maximum in the absorbance trace was taken as the retention time for each solute in each mobile phase.

For comparison, the same set of injections were made under identical conditions using the commercial Hypersil ODS (C18) column described in Example 20.

A comparison of the actual retention time data for the alkyl benzenes on the carbon-clad $ZrO_2$-packed column with that of the solutes on the traditional silica-based commercial Hypersil ODS (C18) column is shown in Table 21-1 below:

TABLE 21-1

| RETENTION OF ALKYL BENZENES AS A FUNCTION OF % ORGANIC: | | | | | | | | |
|---|---|---|---|---|---|---|---|---|
| | 65/35 W/A | | 60/40 W/A | | 55/45 W/A | | 50/50 W/A | |
| solute | $ZrO_2$ | $SiO_2$ | $ZrO_2$ | $SiO_2$ | $ZrO_2$ | $SiO_2$ | $ZrO_2$ | $SiO_2$ |
| BENZENE | 1.84 | 2.65 | 1.45 | | 1.17 | 1.60 | 0.990 | 1.32 |
| TOLUENE | 3.69 | 4.69 | 2.56 | | 1.91 | 2.42 | 1.493 | 1.85 |
| ETHYL BENZENE | 5.75 | | 3.69 | | 2.57 | 3.71 | 1.893 | 2.66 |
| PROPYL BENZENE | 13.80 | | 7.82 | | 4.96 | 6.14 | 3.370 | 4.12 |
| BUTYL BENZENE | >20 | | 17.50 | | 10.26 | 10.28 | 6.443 | 6.48 |
| | 45/55 W/A | | 40/60 W/A | | 35/65 W/A | | 30/70 W/A | |
| solute | $ZrO_2$ | $SiO_2$ | $ZrO_2$ | $SiO_2$ | $ZrO_2$ | $SiO_2$ | $ZrO_2$ | $SiO_2$ |
| BENZENE | 0.87 | 1.11 | 0.78 | 0.95 | 0.71 | 0.84 | 0.657 | 0.758 |
| TOLUENE | 1.21 | 1.48 | 1.03 | 1.21 | 0.89 | 1.03 | 0.799 | 0.897 |
| ETHYL BENZENE | 1.47 | 2.00 | 1.19 | 1.56 | 1.01 | 1.28 | 0.871 | 1.071 |
| PROPYL BENZENE | 2.41 | 2.91 | 1.83 | 2.16 | 1.44 | 1.69 | 1.192 | 1.356 |
| BUTYL BENZENE | 4.31 | 4.34 | 3.06 | 3.06 | 2.27 | 2.28 | 1.762 | 1.742 |

"W" = water
"A" = acetonitrile

The results shown in Table 21-1 indicate that the retention of n-butyl benzene is virtually identical on both columns. For the remaining alkyl benzene solutes (ethyl through butyl), the retentions on the two phases are roughly comparable.

EXAMPLE 22

Comparison of Capacity Factor for Separations with Carbon-Clad $ZrO_2$-Packed HPLC Column and Silica-Packed Column The retention characteristics of several substituted benzene solutes were compared during isocratic reversed-phase chromatography on the carbon-clad $ZrO_2$-packed column and the commercial Hypersil ODS column of Example 20. 0.2 μl injections of the alkyl benzene solute solution into a 2/1 water/ACN (1/1 water/ACN for iodobenzene) mobile phase were made for each of the columns, and equilibrated with 65/35 v/v water/ACN at 0.500 ml/min and 40° C. The concentration of solute in the samples was 1–4 ppt (mg/ml or μl/ml). Absorbance was detected at both 215 nm and 260 nm. The dead volume characteristics of both of the columns were probed by injectioning solutions of deuterium oxide ($D_2O$)/ACN and dilute solutions of uracil and of sodium nitrate.

The capacity factors (k') for the various solutes were calculated from the retention times (tR) after correction for the experimentally determined extracolumn dead volume of 35 μl, based on approximate dead volumes of 200 μl and 150 μl for the carbon-clad $ZrO_2$ column and the Hypersil column, respectively. The capacity factors are listed in Table 22-1 below:

TABLE 22-1

| | | | 5 mm CARBON-CLAD $ZrO_2$ | | HYPERSIL 5 mM C18 $SiO_2$ | |
|---|---|---|---|---|---|---|
| Solute | mg/ml mg/ml | Solvent | tR | k' | tR | k' |
| | | | 0.40 | | 0.30 | |
| $D_2O$ | | | 0.55 | 0.19 | 0.37 | −0.01 |
| ACETONITRILE ($CH_3CN$) | | | 0.54 | 0.17 | 0.46 | 0.30 |
| URACIL ($C_4H_4N_2O_2$) | 1.2 | $H_2O$ | 0.98 | 1.29 | 0.39 | 0.08 |
| PHENOL ($C_6H_5OH$) | 4.4 | 2/1 W/A | 1.33 | 2.15. | 0.92 | 1.82 |
| ANILINE ($C_6H_5NH_2$) | 3.3 | 2/1 W/A | 1.45 | 2.45 | 1.32 | 3.17 |
| BENZENE ($C_6H_6$) | 3.3 | 2/1 W/A | 1.83 | 3.39 | 2.65 | 7.61 |
| m - CRESOL ($C_6H_4CH_3OH$) | 3.3 | 2/1 W/A | 2.19 | 4.30 | 1.22 | 2.82 |
| p - CRESOL ($C_6H_4CH_3OH$) | 3.3 | 2/1 W/A | 2.23 | 4.39 | 1.18 | 2.70 |
| FLUORO BENZENE ($C_6H_5F$) | 3.3 | 2/1 W/A | 2.25 | 4.45 | 2.88 | 8.35 |
| o - CRESOL ($C_6H_4CH_3OH$) | 3.3 | 2/1 W/A | 2.51 | 5.11 | 1.32 | 3.18 |
| BENZONITRILE ($C_6H_5CN$) | 3.3 | 2/1 W/A | 3.07 | 6.51 | 1.57 | 4.00 |
| BENZALDEHYDE ($C_6H_5CHO$) | 3.3 | 2/1 W/A | 3.60 | 7.82 | 1.31 | 3.13 |
| TOLUENE ($C_6H_5CH_3$) | 3.3 | 2/1 W/A | 3.61 | 7.85 | 4.79 | 14.72 |
| CHLORO BENZENE ($C_6H_5Cl$) | 3.3 | 2/1 W/A | 5.42 | 12.37 | 4.88 | 15.03 |
| m - XYLENE ($C_8H_{10}$) | 3.3 | 2/1 W/A | 7.02 | 16.38 | 8.51 | 27.14 |
| p - XYLENE ($C_8H_{10}$) | 3.3 | 2/1 W/A | 7.99 | 18.80 | 8.60 | 27.44 |
| BROMO BENZENE ($C_6H_5Br$) | 3.3 | 2/1 W/A | 7.19 | 16.81 | | |
| NITRO BENZENE ($C_6H_5NO_2$) | 3.3 | 2/1 W/A | 7.78 | 18.29 | 2.08 | 5.71 |
| o - XYLENE ($C_8H_{10}$) | 3.3 | 2/1 W/A | 9.73 | 23.16 | 7.89 | 25.06 |
| IODO BENZENE ($C_6H_5I$) | 3.3 | 1/1 W/A | 14.57 | 35.24 | 7.65 | 24.27 |
| BENZOIC ACID ($C_6H_5COOH$) | 3.4 | 2/1 W/A | >>20 | >>65 | 0.54 | 0.57 |
| Na BENZENE SULFONATE ($C_6H_5NaO_3S$) | 3.4 | 2/1 W/A | >>20 | >>65 | 0.33 | −0.12 |

The results shown in Table 22-1 indicate several unique features of the carbon-clad $ZrO_2$ material. Oxygen-containing solutes (e.g., uracil, phenol, cresols, benzaldehyde, and acids) were significantly more retained on the carbon-clad ZrO₂ material than on the Hypersil (silica) support material. In addition, solutes having strongly dipolar and polarizable groups (e.g., uracil, benzonitrile, benzaldehyde, nitrobenzene, and iodobenzene) were significantly more retained on the carbon-clad ZrO₂ support than on the Hypersil (silica) support. The pure hydrocarbon solutes (e.g., benzene, toluene, xylene) were more strongly retained on the (0.10M sodium hydroxide, NaOH) aqueous solvent conditions. 0.2 μl samples were injected onto the carbon-clad ZrO₂ column, equilibrated with 65/35 aqueous/ACN solvent, were eluted isocratically, and were detected as described above. The results are shown in Table 23-1 below, which lists the retention times of various test solutes for 0.5 ml/min., 40° C. mobile phases of 65/35 1% formic acid (HCOOH)-/ACN, for 65/35 water/ACN, and for 0.1M (pH 13) sodium hydroxide (NaOH)/ACN:

TABLE 23-1

COMPARISON OF RETENTION ON CARBON CLAD ZIRCONIA: pH EFFECTS

| | | | 5 mm CARBON COATED ZIRCONIA COLUMN: | | |
|---|---|---|---|---|---|
| Solute | mg/ml | Solvent | 35/65 ACN/ 1% HCOOH tR | 35/65 ACN/H₂O tR | 35/65 ACN/ 0.1M (pH 13) NaOH tR |
| SODIUM NITRATE | | H₂O | | 0.72 | 0.37 |
| D20 | | — | 0.58 | 0.54 | 0.44 |
| ACETONITRILE | | — | 0.58 | 0.53 | 0.42 |
| URACIL | 1.2 | H₂O | 0.65 | 0.98 | 0.38 |
| PHENOL | 4.4 | 2/1 W/A | 1.22 | 1.32 | 0.41 |
| ANILINE | 3.3 | 2/1 W/A | 0.53 | 1.44 | 0.92 |
| BENZENE | 3.3 | 2/1 W/A | 1.55 | 1.82 | 1.28 |
| m - CRESOL | 3.3 | 2/1 W/A | 1.86 | 2.19 | 0.46 |
| p - CRESOL | 3.3 | 2/1 W/A | 1.93 | 2.22 | 0.49 |
| FLUORO BENZENE | 3.3 | 2/1 W/A | 1.90 | 2.25 | 1.57 |
| o - CRESOL | 3.3 | 2/1 W/A | 2.16 | 2.51 | 0.52 |
| BENZONITRILE | 3.3 | 2/1 W/A | 2.76 | 3.07 | 2.29 |
| BENZALDEHYDE | 3.3 | 2/1 W/A | 3.04 | 3.59 | 2.87 |
| TOLUENE | 3.3 | 2/1 W/A | 3.17 | 3.60 | 2.48 |
| CHLORO BENZENE | 3.3 | 2/1 W/A | 4.81 | 5.41 | 3.75 |
| ETHYL BENZENE | 4 | 2/1 W/A | 4.43 | 5.75 | 3.72 |
| m - XYLENE | 3.3 | 2/1/2 W/A/M | 5.69 | 7.02 | 4.62 |
| p - XYLENE | 3.3 | 2/1 W/A | 6.33 | 7.99 | 5.24 |
| BROMO BENZENE | 3.3 | 2/1 W/A | 6.35 | 7.19 | 5.19 |
| NITRO BENZENE | 3.3 | 2/1 W/A | 6.70 | 7.78 | 5.84 |
| o -XYLENE | | 2/1 W/A | 7.61 | 9.73 | 6.49 |
| n-PROPYL BENZENE | 4.0 | 2/1/2 W/A/M | 10.10 | 13.80 | 8.30 |
| IODO BENZENE | 3.3 | 2/1 W/A | 12.35 | 14.56 | 9.75 |
| BENZOIC ACID | 3.4 | 2/1 W/A | 8.15 | >>20 | 0.37 |
| Na BENZENE SULFONATE | 3.4 | 2/1 W/A | >>20 | >>20 | 0.37 |

Hypersil (silica) support material than on the carbon-clad ZrO₂ material. The retention of polysubstituted species such as the xylenes and the cresols indicates a geometric dependency on the carbon-clad ZrO₂ material with a retention order of meta<para<ortho. In contrast, the Hypersil (silica) material exhibited differing retention orders of para<meta<ortho< and ortho<meta<para for the cresols and the xylenes, respectively.

EXAMPLE 23

Comparison of Capacity Factor for Carbon-Clad ZrO₂-Packed HPLC Column and Silica-Packed Column under Acidic and Basic Conditions The retention on the 10 cm×2.1 mm carbon-clad ZrO₂-packed column of Example 20 was also evaluated under acidic (1% formic acid, HCOOH) and basic The usefulness of the carbon-clad ZrO₂ stationary phase for separations in which either strongly acidic or basic mobile phases are utilized is demonstrated by the retention data in Table 23-1. The results indicate that the retention of solutes with ionizable acidic and basic groups change dramatically with changes in pH of the mobile phase, while the shifts in retention for other solutes are significantly less for the extreme pH mobile phases. Most significantly, solutes such as benzoic acid and benzene sulfonate, which are strongly retained in acidic and neutral solutions, elute in the dead volume of the hydroxide solution. Conversely, aniline retention drops dramatically in acidic solution relative to neutral or basic mobile phases.

These trends are even more apparent when represented as selectivity values (α) relative to benzene, as shown in Table 23-2 below:

TABLE 23-2

ALPHA VALUES (RELATIVE TO BENZENE) FOR CARBON CLAD ZIRCONIA
k'(x)/k' (benzene)

| | | | 5 mm CARBON COATED ZIRCONIA COLUMN: | | |
|---|---|---|---|---|---|
| Solute | mg/ml | Solvent | 35/65 ACN/ 1% HCOOH tR | 35/65 ACN/H₂O tR | 35/65 ACN/ 0.1M NaOH tR |
| URACIL | 1.2 | H₂O | 0.39 | 0.52 | 0.26 |
| PHENOL | 4.4 | 2/1 W/A | 0.77 | 0.71 | 0.28 |
| ANILINE | 3.3 | 2/1 W/A | 0.31 | 0.78 | 0.70 |
| BENZENE | 3.3 | 2/1 W/A | 1.00 | 1.00 | 1.00 |
| m - CRESOL | 3.3 | 2/1 W/A | 1.21 | 1.20 | 0.32 |

TABLE 23-2-continued

ALPHA VALUES (RELATIVE TO BENZENE) FOR CARBON CLAD ZIRCONIA
$k'(x)/k'$ (benzene)

| | | | 5 mm CARBON COATED ZIRCONIA COLUMN: | | |
|---|---|---|---|---|---|
| Solute | mg/ml | Solvent | 35/65 ACN/ 1% HCOOH tR | 35/65 ACN/H$_2$O tR | 35/65 ACN/ 0.1M NaOH tR |
| p - CRESOL | 3.3 | 2/1 W/A | 1.25 | 1.22 | 0.35 |
| FLUORO BENZENE | 3.3 | 2/1 W/A | 1.23 | 1.24 | 1.24 |
| o - CRESOL | 3.3 | 2/1 W/A | 1.41 | 1.39 | 0.37 |
| BENZONITRILE | 3.3 | 2/1 W/A | 1.81 | 1.71 | 1.83 |
| BENZALDEHYDE | 3.3 | 2/1 W/A | 2.00 | 2.00 | 2.31 |
| TOLUENE | 3.3 | 2/1 W/A | 2.09 | 2.01 | 1.99 |
| CHLORO BENZENE | 3.3 | 2/1 W/A | 3.20 | 3.04 | 3.03 |
| ETHYL BENZENE | 4 | 2/1/2 W/A/M | 2.94 | 3.23 | 3.01 |
| m - XYLENE | 3.3 | 2/1 W/A | 3.79 | 3.96 | 3.75 |
| p - XYLENE | 3.3 | 2/1 W/A | 4.22 | 4.51 | 4.26 |
| BROMO BENZENE | 3.3 | 2/1 W/A | 4.23 | 4.05 | 4.22 |
| NITRO BENZENE | 3.3 | 2/1 W/A | 4.47 | 4.39 | 4.76 |
| o -XYLENE | | 2/1 W/A | 5.09 | 5.50 | 5.29 |
| n-PROPYL BENZENE | 4.0 | 2/1/2 W/A/M | 6.76 | 7.82 | 6.79 |
| IODO BENZENE | 3.3 | 2/1 W/A | 8.28 | 8.25 | 7.98 |
| BENZOIC ACID | 3.4 | 2/1 W/A | 5.45 | — | 0.25 |
| Na BENZENE SULFONATE | 3.4 | 2/1 W/A | — | — | 0.25 |
| *assuming VO = 200 ml | | | 3.70 | 4.38 | 3.03 |

EXAMPLE 24

Comparison of Toluene and Heptane as Carbon Sources

The following experiments were performed in order to study the effect of varying the carbon source used in the present low pressure CVD method on chromatographic performance of the resulting spherules.

Two approximately 5 g batches of carbon-clad ZrO$_2$ spherules were prepared, one according to the procedure of Example 9 (toluene carbon source), and the other according to the procedure of Example 15 (n-heptane carbon source). Samples from each batch were used as the packing of two 5×0.46 cm HPLC columns operated with a 40° C. mobile phase of 40% THF and 60% water. The upward slurry packing technique described in Example 18 was used to pack both columns. An identical mixture of ethylbenzene (EtBen) and nitrobenzene (NitroBen) was separated on each column. The results of the separations are shown in Table 24-1 below:

TABLE 24-1

| Flow Rate[1] | Comparison of CVD Heptane and CVD Toluene Chromatographic Efficiency | | | |
|---|---|---|---|---|
| | CVD Heptane | | CVD Toluene | |
| (ml/min) | h[2]-EtBen | h-NitroBen | h-EtBen | h-NitroBen |
| 1.5 | 4.5 | 5.8 | 14.8 | 342 |
| 1.0 | 4.3 | 5.3 | 13.5 | 236 |
| 0.5 | 3.6 | 4.7 | 15.0 | — |
| 0.35 | 3.6 | 4.8 | 14.2 | 283 |
| 0.2 | 5.6 | 5.0 | 19.3 | 239 |

[1]flow rate of mobile phase
[2]h = reduced plate height

The high values of reduced plate height, indicating poor chromatographic efficiency, and the weak dependence on flow rate observed in Table 24-1 for the column prepared using toluene as the carbon source, indicate that the reduced chromatographic efficiency is due to chemical processes, instead of sluggish diffusion in micropores or similar physical processes.

Additional separations of a mixture of ethylbenzene, butylphenyl ether, propiophenone, and nitrobenzene were performed on both columns. Capacity factors (k') and reduced plate heights (h) were calculated for each solute, and are shown in Table 24-2 below:

TABLE 24-2

| Chromatographic Separation of Different Solutes on CVD Heptane and CVD Toluene | | | | |
|---|---|---|---|---|
| | CVD Heptane | | CVD Toluene | |
| Solute | k' | h | k' | h |
| Ethylbenzene | 3.3 | 4.5 | 2.4 | 11 |
| Butylphenyl Ether | 10.0 | 7.4 | 5.1 | 28 |
| Propiophenone | 3.8 | 7.6 | 2.5 | 120 |
| Nitrobenzene | 3.6 | 5.3 | 5.5 | 194 |

Loading studies of both columns were also performed by calculating the capacity factor, k,, for various amounts of sample which were injected onto the columns. A mobile phase of 40% THF/60% water was maintained throughout the study at a temperature of 40° C. and a flow rate of 1 ml/min. The sample was an aqueous solution of nitrobenzene, at a concentration of approximately 10 mg nitrobenze/ml solution. The results of the loading studies are shown in Table 24-3 below:

TABLE 24-3

| Comparison of Chromatographic Loading on CVD n-Heptane and CVD Toluene | | | | |
|---|---|---|---|---|
| Amt Injected | CVD n-Heptane | | CVD Toluene | |
| (mg) | k' | % change | k' | % change |
| 0.01 | 3.75 | | 13.3 | |
| | | 1.3 | | 27 |
| 0.02 | 3.70 | | 9.7 | |
| | | 1.3 | | 36 |
| 0.05 | 3.65 | | 6.2 | |
| | | 1.4 | | 31 |
| 0.10 | 3.60 | | 4.3 | |

The results shown in Tables 24-1, 24-2, and 24-3 indicate that the support material prepared by deposition of carbon from thermal decomposition of n-heptane exhibits significantly improved chromatographic efficiency and loading characteristics as compared to the support material prepared from thermal decomposition of toluene. These results also indicate that variation in the carbon source can strongly affect the various chromatographic properties (e.g., retention, capacity, selectivity and efficiency) of the resultant materials. Thus, control and variation of the carbon source material, together with optional reductive treatment as described in Example 14, can provide differing reversed phase materials suitable for differing separation needs.

EXAMPLE 25

Use of n-Butanol as Carbon Source

A. Preparation of Carbon-Clad $ZrO_2$

A 6.04 g sample of $ZrO_2$ spherules prepared according to Example 8A was placed in a ceramic sample boat which was then centerally located in a deposition chamber maintained at 700° C. With initial system pressure established at 0.95 Torr, n-butanol was released into the chamber until the system pressure as measured by the vacuum gauge had increased to 6 Torr. Pressure was maintained at between 5.5-6.4 Torr throughout the deposition process. After 45 minutes of carbon deposition, the sample was removed from the deposition chamber and allowed to cool under vacuum for 25 minutes. By visual observation, the particles located at the top of the sample boat were very dark in color, but those at the bottom of the sample boat were much lighter, indicating a less complete carbon cladding of these particles. The deposition process was repeated a second time after thorough mixing of the particle bed. During the second deposition process, the system pressure was maintained at a vacuum gauge reading of between 6.5-12 Torr by warming the carbon source flask containing the n-butanol. After 20 minutes of carbon deposition, the sample was removed and allowed to cool under vacuum for 25 minutes.

B. Chromatographic Analysis

Figure 6:
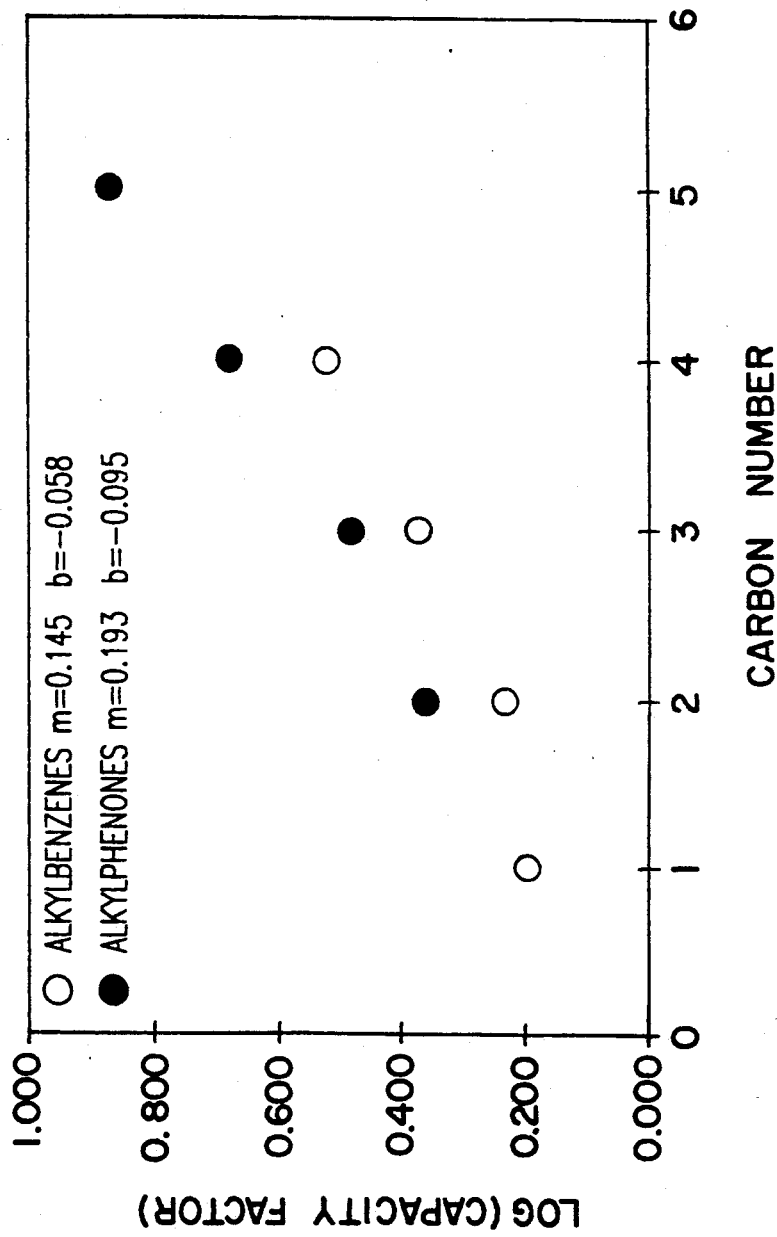

The carbon-clad spherules prepared as described in part A above were packed into a 5×0.46 cm HPLC column using the upward slurry technique described in Example 18 above. A 50% THF/50% water mobile phase maintained at a temperature of 40° C. and a flow rate of 0.35 ml/min was utilized for the separation of a mixture of alkylphenones and alkylbenzenes. The results of the separation are shown in FIG. 6, which depicts a plot of log k, vs. carbon number for each of the alkylphenone and alkylbenzene solutes present in the mixture. Reduced plate heights were calculated for each solute, and compared with the reduced plate heights calculated for the same solutes separated on a column packed with carbon-clad zirconia prepared by deposition of carbon from n-heptane (see Example 16). This comparison indicated that the chromatographic efficiency of the material prepared with n-butanol is generally greater than that of the material prepared with n-heptane. Table 25-1 lists the reduced plate height values:

TABLE 25-1

Comparison of CVD n-Butanol and CVD n-Heptane Chromatographic Efficiency

| Solute | CVD n-Butanol h[1] | CVD n-Heptane h |
|---|---|---|
| Butylbenzene | 4.1 | 5.8 |
| Butylphenyl Ether | 7.4 | 10.3 |
| Valrophenone | 5.0 | 5.9 |
| Nitrobenzene | 5.2 | 4.7 |

[1] h = reduced plate height

The invention has been described with reference to various specific and preferred embodiments and techniques. However, it should be understood that many variations and modifications may be made while remaining within the spirit and scope of the invention.

What is claimed is:

1. A zirconium oxide spherule which has a diameter of about 1–500 microns and having a surface which is substantially covered by a carbon cladding.

2. The carbon-clad zirconium oxide spherule of claim 1 which is porous.

3. The carbon-clad zirconium oxide spherule of claim 2 which has a surface area of about 5–300 $m^2/g$.

4. The carbon-clad zirconium oxide spherule of claim 2 which has a pore diameter of about 20–5000 Å.

5. A packing material useful as a stationary phase in a liquid chromatography column, comprising a plurality of the carbon-clad zirconium oxide particles of claim 1.

6. A packing material useful as a stationary phase in a gas chromatography column, comprising a plurality of the carbon-clad zirconium oxide particles of claim 1.

7. A packing material useful as a stationary phase in a supercritical fluid chromatography column, comprising a plurality of the carbon-clad zirconium oxide particles of claim 1.

8. Carbon-clad inorganic oxide spherules which are prepared by a process comprising the steps of:
    (a) placing a plurality of porous inorganic oxide spherules having a surface, a diameter of about 1–500 microns, a surface area of about 5–300 $m^2/g$ and a pore diameter of about 20–5000 Å within a reaction chamber;
    (b) elevating the temperature of the reaction chamber and reducing the pressure of the reaction chamber; and
    (c) introducing a vapor comprising carbon into the reaction chamber so as to thermally decompose the vapor and deposit a cladding of the carbon onto the porous spherules, substantially covering the surface of the spherules.

9. A porous zirconium oxide particle which has a core $ZrO_2$ particle having a pore diameter from about 20–5000 Angstroms having a surface which is substantially covered by a carbon cladding.

10. The porous zirconium oxide particle of claim 9 comprising a core $ZrO_2$ particle having a surface area of about 5–300 $m^2/g$.

* * * * *

UNITED STATES PATENT AND TRADEMARK OFFICE
CERTIFICATE OF CORRECTION

PATENT NO. : 5,108,597
DATED : April 28, 1992
INVENTOR(S) : Funkenbusch et al.

It is certified that error appears in the above-identified patent and that said Letters Patent is hereby corrected as shown below:

Title page, item [75] Inventors,
for "Eric F. Funkenbusch, St. Paul; Peter W. Carr, Minneapolis; Douglas A. Hanggi; Thomas P. Webber, both of St. Paul, of of Minn."
read --Eric F. Funkenbusch, White Bear Lake; Peter W. Carr, Minneapolis; Douglas A. Hanggi, St. Paul; Thomas P. Weber, Minneapolis, all of Minn.--.

At col. 2, line 6, for " 'b 150" read --'150--.

At col. 26, line 60, "mg/m/l" read --mg/ml--.

At col. 27, table 21-1 line 17, for "4.69" read --4.79--.

At col. 32, line 37, for "k,," read --k',--.

At col. 33, line 47, for "k," read --k'--.

Signed and Sealed this

Twenty-ninth Day of November, 1994

Attest:

BRUCE LEHMAN

*Attesting Officer*     *Commissioner of Patents and Trademarks*